(12) United States Patent
Nishio et al.

(10) Patent No.: US 9,971,022 B2
(45) Date of Patent: May 15, 2018

(54) RADAR APPARATUS

(71) Applicant: FUJITSU TEN LIMITED, Kobe-shi, Hyogo (JP)

(72) Inventors: Daisuke Nishio, Kobe (JP); Masatoshi Aoki, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 629 days.

(21) Appl. No.: 14/573,382

(22) Filed: Dec. 17, 2014

(65) Prior Publication Data

US 2015/0212198 A1 Jul. 30, 2015

(30) Foreign Application Priority Data

Jan. 29, 2014 (JP) .................................. 2014-014128

(51) Int. Cl.
| | |
|---|---|
| *G01S 7/41* | (2006.01) |
| *G01S 13/34* | (2006.01) |
| *G01S 13/42* | (2006.01) |
| *G01S 13/58* | (2006.01) |
| *G01S 13/93* | (2006.01) |

(52) U.S. Cl.
CPC ............ *G01S 7/415* (2013.01); *G01S 13/345* (2013.01); *G01S 13/42* (2013.01); *G01S 13/584* (2013.01); *G01S 13/931* (2013.01); *G01S 13/424* (2013.01); *G01S 2013/9353* (2013.01); *G01S 2013/9375* (2013.01)

(58) Field of Classification Search
CPC ...... G01S 13/345; G01S 13/42; G01S 13/424; G01S 13/584; G01S 13/931; G01S 13/66; G01S 7/415; G01S 7/2923; G01S 1/02

USPC .......................................... 342/385, 6, 77, 98
See application file for complete search history.

(56) References Cited

U.S. PATENT DOCUMENTS

| | | | | |
|---|---|---|---|---|
| 6,686,870 | B2 * | 2/2004 | Nishimura | G01R 23/14 342/109 |
| 6,798,373 | B2 * | 9/2004 | Kishida | G01S 7/4008 342/109 |
| 6,856,278 | B2 * | 2/2005 | Nakanishi | G01S 13/345 342/118 |
| 6,900,754 | B2 * | 5/2005 | Ono | G01S 13/345 342/118 |

(Continued)

FOREIGN PATENT DOCUMENTS

| | | |
|---|---|---|
| JP | A-2001-324566 | 11/2001 |
| JP | 2013-250151 A | 12/2013 |

*Primary Examiner* — Chuong P Nguyen
(74) *Attorney, Agent, or Firm* — Oliff PLC

(57) ABSTRACT

A radar apparatus is installed in a vehicle and receives a reflection wave from a target to derive information about the target. The radar apparatus includes a signal processor to extract a peak signal that is obtained from a difference frequency between a transmission signal whose frequency changes in a prescribed cycle and a reception signal representing reception of a reflection wave that is generated from a transmission wave of the transmission signal reflected by the target, in each of an up period in which the frequency of the transmission signal increases and a down period in which the frequency decreases; and to determine whether a target information derivation environment is good or bad based on a number of the peak signals each of which corresponds to a static object having a plurality of angle information.

16 Claims, 13 Drawing Sheets

(56) References Cited

U.S. PATENT DOCUMENTS

| | | | | |
|---|---|---|---|---|
| 8,179,303 B2* | 5/2012 | Kishida | ............ | G01S 13/42 |
| | | | | 342/107 |
| 8,427,361 B2* | 4/2013 | Sato | ............ | G01S 7/354 |
| | | | | 342/107 |
| 9,073,548 B2* | 7/2015 | Mizutani | ............ | G01S 7/411 |
| 9,372,261 B2* | 6/2016 | Aoki | ............ | G01S 13/50 |
| 9,618,607 B2* | 4/2017 | Asanuma | ............ | G01S 13/345 |
| 2011/0006941 A1* | 1/2011 | Samukawa | ............ | G01S 13/345 |
| | | | | 342/70 |
| 2014/0159948 A1* | 6/2014 | Ishimori | ............ | G01S 7/41 |
| | | | | 342/200 |
| 2015/0234041 A1* | 8/2015 | Aoki | ............ | G01S 7/4004 |
| | | | | 342/70 |
| 2015/0346324 A1* | 12/2015 | Takasago | ............ | G01S 7/352 |
| | | | | 342/70 |

* cited by examiner

| NUMBER | FREQUENCY | HORIZONTAL ANGLE | TYPE |
|---|---|---|---|
| PAIR 1 | fu1-fd1 | $\theta u11-\theta d11$ | STATIC OBJECT |
| PAIR 2 | fu1-fd1 | $\theta u12-\theta d12$ | STATIC OBJECT |
| PAIR 3 | fu2-fd2 | $\theta u21-\theta d21$ | STATIC OBJECT |
| PAIR 4 | fu3-fd3 | $\theta u31-\theta d31$ | STATIC OBJECT |
| PAIR 5 | fu3-fd3 | $\theta u32-\theta d32$ | STATIC OBJECT |
| PAIR 6 | fu4-fd4 | $\theta u41-\theta d41$ | STATIC OBJECT |
| PAIR 7 | fu3-fd3 | $\theta u33-\theta d33$ | STATIC OBJECT |
| PAIR 8 | fu5-fd5 | $\theta u51-\theta d51$ | STATIC OBJECT |
| PAIR 9 | fu6-fd6 | $\theta u61-\theta d61$ | STATIC OBJECT |
| PAIR 10 | fu5-fd5 | $\theta u52-\theta d52$ | STATIC OBJECT |
| ... | ... | ... | ... |

FIG.11

| FREQUENCY | SAME-BIN PAIR NUMBER |
|---|---|
| fu1-fd1 | 1 |
| fu2-fd2 | 0 |
| fu3-fd3 | 1 |
| fu4-fd4 | 0 |
| fu5-fd5 | 1 |
| fu6-fd6 | 0 |
| ... | ... |

FIG.12

| NO. OF TIMES | THIS TIME | PREVIOUS TIME | 2-TIMES BEFORE | 3-TIMES BEFORE | 4-TIMES BEFORE | 5-TIMES BEFORE | 6-TIMES BEFORE | 7-TIMES BEFORE | 8-TIMES BEFORE | 9-TIMES BEFORE | 10-TIMES BEFORE | MAX. | AVG. |
|---|---|---|---|---|---|---|---|---|---|---|---|---|---|
| 1 | 3 | | | | | | | | | | | 3 | 3 |
| 2 | 7 | 3 | | | | | | | | | | 7 | 3.04 |
| 3 | 4 | 7 | 3 | | | | | | | | | 7 | 3.0796 |
| ⋮ | ⋮ | ⋮ | ⋮ | ⋮ | ⋮ | ⋮ | ⋮ | ⋮ | ⋮ | ⋮ | ⋮ | ⋮ | ⋮ |
| n | 3 | 5 | 4 | 6 | 3 | 3 | 3 | 3 | 0 | 2 | 1 | 6 | 3 |
| n+1 | 13 | 3 | 5 | 4 | 6 | 3 | 3 | 3 | 3 | 0 | 2 | 13 | 3.1 |
| n+2 | 15 | 13 | 3 | 5 | 4 | 6 | 3 | 3 | 3 | 3 | 0 | 15 | 3.219 |
| n+3 | 16 | 15 | 13 | 3 | 5 | 4 | 6 | 3 | 3 | 3 | 3 | 16 | 3.34681 |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG.13

RADAR APPARATUS

BACKGROUND OF THE INVENTION

Field of the Invention

The invention relates to a radar apparatus for deriving a target.

Description of the Background Art

Conventionally, a radar apparatus installed in a vehicle transmits a transmission wave from a transmission antenna, receives a reflection wave from a target at a reception antenna, and derives a target location to the vehicle (radar apparatus) or other information. Specifically, the radar apparatus first mixes, to generate a beat signal, a transmission signal corresponding to the transmission wave whose frequency changes in a prescribed cycle, and a reception signal corresponding to the reflection wave. That is, the radar apparatus generates a beat signal based on a difference frequency (beat frequency) between the transmission signal and the reception signal in each of the UP sections in which a frequency increases in a prescribed cycle and DOWN sections in which a frequency decreases in a prescribed cycle.

Next, the radar apparatus generates a signal (conversion signal) for each frequency by performing FFT (Fast Fourier Transform) processing on the beat signal. Then, the radar apparatus extracts, in each of the UP section and the DOWN section, a prescribed number of the signals whose levels are high as peak signals among the conversion signals. After that, the radar apparatus pairs a peak signal in the UP section and a peak signal in the DOWN section based on a prescribed condition to derive pair data.

Next, the radar apparatus determines whether there is a temporally continuous relation between the pair data derived in the previous processing and the pair data derived in the processing this time. In the case where there is a temporally continuous relation between the two sets of the pair data, the radar apparatus derives location information, relative velocity information or other information about a target based on the derived pair data.

Then, the radar apparatus outputs the derived location information, relative velocity information or other information about the target to a vehicle controller, and performs necessary vehicle control in accordance with the target information.

However, in the case where a vehicle is traveling in the environment having a structure of a wall or a ceiling laterally or upward, for example, in a tunnel or on a truss bridge, the radar apparatus receives a lot of reflection waves from the wall or the ceiling, which may cause erroneous pairing. As a result, the erroneous pairing may cause erroneous target derivation, which may degrade detection performance.

SUMMARY OF THE INVENTION

According to one aspect of the invention, a radar apparatus is installed in a vehicle and receives a reflection wave from a target to derive information about the target. The radar apparatus includes a signal processor to extract a peak signal that is obtained from a difference frequency between a transmission signal whose frequency changes in a prescribed cycle and a reception signal representing reception of a reflection wave that is generated from a transmission wave of the transmission signal reflected by the target, in each of an up period in which the frequency of the transmission signal increases and a down period in which the frequency of the transmission signal decreases; and to determine whether a target information derivation environment is good or bad based on a number of the peak signals each of which corresponds to a static object having a plurality of angle information.

It is determined whether the target information derivation environment is good or bad based on the number of the peak signals each of which corresponds to the static object having the plurality of angle information. Thus, for example, an environment where a plurality of static objects at the same distance are frequently derived may be determined as a bad environment. As a result, it is possible to grasp in advance whether the reliability of the derived target information is high or low.

According to another aspect of the invention, a radar apparatus is installed in a vehicle and receives a reflection wave from a target to derive information about the target. The radar apparatus includes signal processor to extract a peak signal that is obtained from a difference frequency between a transmission signal whose frequency changes in a prescribed cycle and a reception signal representing reception of a reflection wave that is generated from a transmission wave of the transmission signal reflected by the target, in each of an up period in which the frequency of the transmission signal increases and a down period in which the frequency of the transmission signal decreases; and to pair the peak signal extracted in the up period and the peak signal extracted in the down period to generate pair data; and to determine whether a target information derivation environment is good or bad based on a number of frequencies of the pair data each of which corresponds to a static object having a plurality of angle information.

It is determined whether the target information derivation environment is good or bad based on the number of the frequencies of the pair data each of which corresponds to the static object having the plurality of angle information. Thus, for example, an environment where a plurality of static objects at the same distance are frequently derived may be determined as a bad environment. As a result, it is possible to grasp in advance whether the reliability of the derived target information is high or low Therefore, the object of the invention is to provide the technology for grasping, when an own vehicle is traveling in a bad environment that may degrade detection performance, that the vehicle is traveling in the bad environment.

These and other objects, features, aspects and advantages of the invention will become more apparent from the following detailed description of the invention when taken in conjunction with the accompanying drawings.

BRIEF DESCRIPTION OF THE DRAWINGS

FIG. 11 shows static object pair data for description.

FIG. 12 shows same-BIN pair numbers for description.

FIG. 13 shows maximum total same-BIN pair numbers and average total same-BIN pair numbers for description.

DESCRIPTION OF THE EMBODIMENTS

Hereinafter, some embodiments of the invention are described based on attached drawings.

<1. Embodiment>

<1-1. Configuration>

Figure 1:
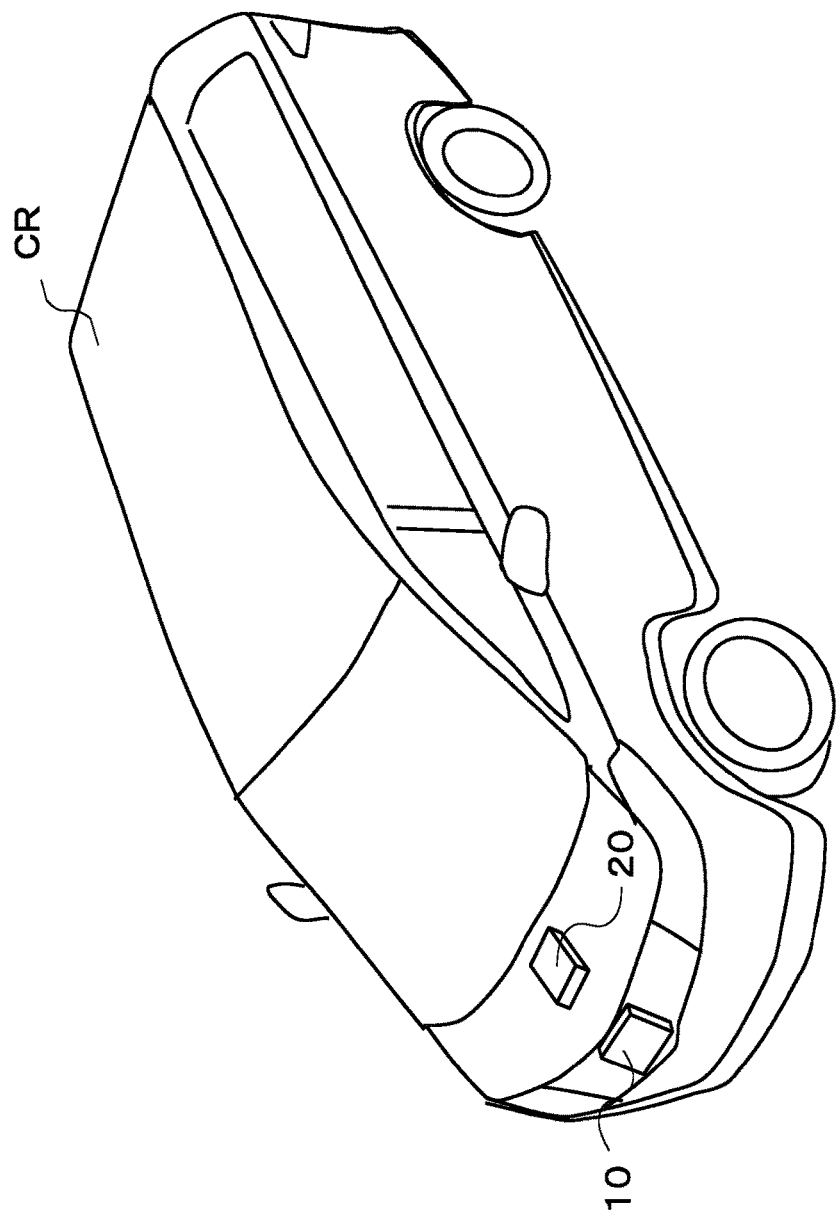
FIG. 1 shows a whole picture of a vehicle.
Figure 2:
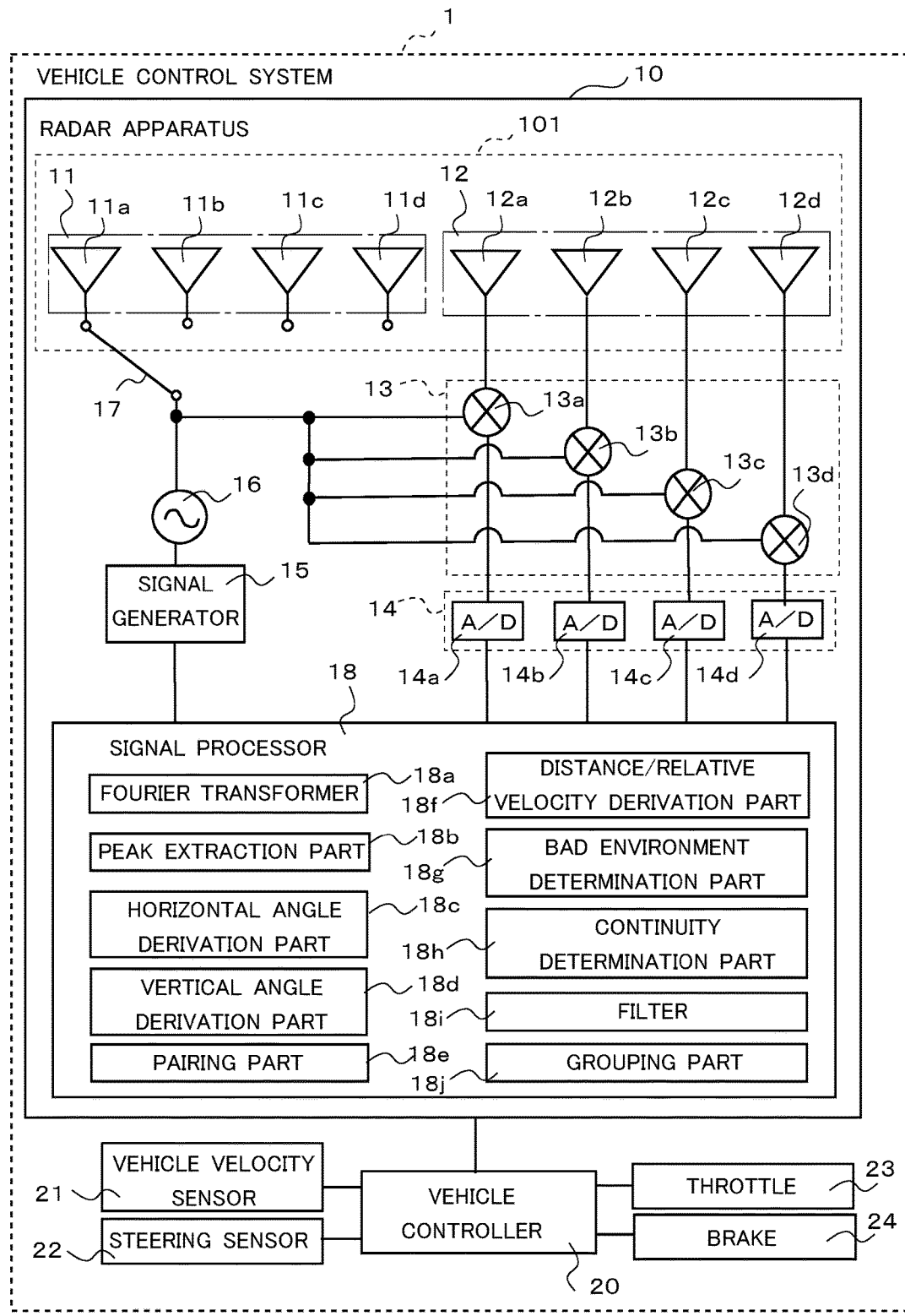
FIG. 2 shows a block diagram of a vehicle control system.

The following explanation starts with the configuration of the invention. FIG. 1 shows the whole picture of a vehicle CR. The vehicle CR mainly includes a radar apparatus 10 and a vehicle controller 20. The radar apparatus 10 and the vehicle controller 20 are a part of a vehicle control system 1. FIG. 2 shows a schematic block diagram of the vehicle control system 1. The vehicle control system 1 is a system for controlling the behavior of the vehicle CR, including the radar apparatus 10, the vehicle controller 20, a vehicle velocity sensor 21, a steering sensor 22, a throttle 23 and a brake 24, as shown in FIG. 2. The radar apparatus 10 is electrically connected to the vehicle controller 20. The vehicle controller 20 is electrically connected to the vehicle velocity sensor 21, the steering sensor 22, the throttle 23 and the brake 24. While the radar apparatus 10 will be detailed later, other parts are explained first.

The vehicle controller 20 is an ECU (Electronic Control Unit) that controls each apparatus on the vehicle CR. The vehicle controller 20 performs at least one vehicle control among various types of vehicle control in accordance with the driving status of the vehicle CR or other conditions. For example, ACC (Adaptive Cruise Control) and PCS (Pre-Crash Safety System) correspond to the vehicle control. ACC is the control for controlling a vehicle to follow another vehicle traveling ahead (hereinafter, referred to as "a preceding vehicle") while keeping a distance between the vehicle and the preceding vehicle. Specifically, the vehicle controller 20 controls the throttle 23 or the brake 24 as the vehicle CR travels. Thereby, the vehicle controller 20 controls the vehicle CR to follow the preceding vehicle while keeping a prescribed distance to the preceding vehicle. This allows the vehicle CR to travel while following the preceding vehicle in the lane of the vehicle CR currently traveling.

PCS is the control for protecting a passenger in a vehicle in case of a collision with another vehicle. Specifically, when the vehicle CR is traveling with a risk of a collision with another vehicle, the vehicle controller 20 warns a passenger in the vehicle CR by use of an alarm that is not shown in the figure, lowers the velocity of the vehicle CR by controlling the brake 24, or holds the passenger in a seat by fastening a seat belt of the passenger in the vehicle. This reduces impact on the passenger in the vehicle CR even if the vehicle CR collides with another vehicle.

The vehicle velocity sensor 21 outputs to the vehicle controller 20 a signal in accordance with a velocity of the vehicle CR based on the number of rotations of an axle of the vehicle CR. The vehicle controller 20 derives the current velocity of the vehicle CR based on the signal from the vehicle velocity sensor 21.

The steering sensor 22 derives a rotation angle of the steering wheel operated by a driver in the vehicle CR. As a result, the steering sensor 22 outputs to the vehicle controller 20 the angle information about the vehicle body of the vehicle CR. The vehicle controller 20 derives a curve radius of the lane of the vehicle CR currently traveling based on the information obtained from the steering sensor 22.

The throttle 23 accelerates the vehicle CR in accordance with operation by the driver in the vehicle CR. The throttle 23 also accelerates the vehicle CR in accordance with the control performed by the vehicle controller 20. In an example, the throttle 23 accelerates the vehicle CR so as to keep the longitudinal distance constant between the vehicle CR and the preceding vehicle.

The brake 24 slows down the vehicle CR in accordance with operation by the driver in the vehicle CR. The brake 24 also slows down the vehicle CR in accordance with the control performed by the vehicle controller 20. In an example, the brake 24 slows down the vehicle CR so as to keep the longitudinal distance constant between the vehicle CR and the preceding vehicle.

The next explanation is about the radar apparatus 10. The radar apparatus 10 is installed near a front bumper of the vehicle CR. The radar apparatus 10 derives target information by scanning a prescribed scanning range by one scanning The prescribed scanning range includes a prescribed range in horizontal direction to a road surface and a prescribed range in vertical direction to the road surface. The target information to be derived includes a position in horizontal direction to the road surface (longitudinal distance and lateral distance), a position in vertical direction to the road surface (height), and a relative velocity of the target to the vehicle CR.

The longitudinal distance is a distance where the reflection wave generated due to reflection by the target travels up to a reception antenna of the radar apparatus 10. The lateral distance is a distance between the vehicle CR and the target in a substantially-orthogonal direction to a reference line that virtually extends toward a traveling direction of the vehicle CR. The lateral distance is derived based on trigonometric functions by use of the information of the angle and the longitudinal distance about the target to the vehicle CR.

The longitudinal distance may be a distance between the target and the vehicle CR in the direction of the reference line that virtually extends toward the traveling direction of the vehicle CR, not the distance where the reflection wave generated due to reflection by the target travels up to a reception antenna of the radar apparatus 10. In this case, the longitudinal distance is also derived based on the trigonometric functions by use of the information of the angle about the target to the vehicle CR and the distance where the reflection wave generated due to reflection by the target travels up to a reception antenna of the radar apparatus 10.

As described above, the radar apparatus 10 derives position information about the target to the vehicle CR. In addition, the radar apparatus 10 derives a relative velocity that is the velocity of the target to the velocity of the vehicle CR.

The radar apparatus 10 shown in FIG. 1 is installed near the front bumper of the vehicle CR. However, the installation position is not limited to this. In an example, the radar apparatus 10 may be installed at anywhere, such as near a rear bumper of the vehicle CR, or near a side mirror set in a side of the vehicle CR, as long as the radar apparatus 10 can derive a target in accordance with the purpose of the control performed by the vehicle controller 20 to the vehicle CR.

The next explanation based on FIG. 2 is about the concrete configuration of the radar apparatus 10. As shown in FIG. 2, the radar apparatus 10 includes an antenna 101, a mixer 13 (13a to 13d), an AD (Analog to Digital) converter 14 (14a to 14d), a signal generator 15, an oscillator 16, a switch 17, and a signal processor 18.

The antenna 101 includes a transmission antenna 11 and a reception antenna 12. The transmission antenna 11 is an antenna for outputting a transmission wave of a transmission signal outside the vehicle. The transmission antenna 11 is connected to the oscillator 16, and outputs outside the vehicle the transmission wave corresponding to the transmission signal transmitted from the oscillator 16. The transmission antenna 11 is made up of four antennas (11a, 11b, 11c and 11d), and the switch 17 switches an antenna for outputting a transmission wave in a prescribed cycle. That is, the transmission wave is output from one of the four transmission antennas.

The reception antenna 12 is the antenna for receiving the reflection wave generated from the transmission wave transmitted from the transmission antenna 11 due, due to reflection by the target. The reception antenna 12 is made up of four antennas (12a, 12b, 12c and 12d), and each of the reception antennas 12a to 12d receives the reflection wave. The configuration of the transmission antenna 11 and the reception antenna 12, and transmission range of the transmission wave transmitted from the transmission antenna 11 are detailed later.

The mixer 13 (13a, 13b, 13c and 13d) is connected to the reception antenna 12 (12a, 12b, 12c and 12d) respectively, mixing the reception signal corresponding to the reflection wave received by the reception antenna 12 and the transmission signal corresponding to the transmission wave. The mixer 13 generates a beat signal that corresponds to the difference between the reception signal and the transmission signal when mixing the reception signal and the transmission signal, and outputs the generated beat signal to the AD converter 14.

Each of the AD converters 14a, 14b, 14c and 14d is connected to each of the mixers 13a, 13b, 13c and 13d respectively, converting the analog beat signal transmitted from the mixer 13 into a digital signal. Specifically, the AD converter 14 samples the analog beat signal in a prescribed cycle, quantizes the sampled beat signal, and then converts the signal into a digital signal. After that, the AD converter 14 outputs the digital signal after conversion to the signal processor 18.

The signal generator 15 generates a triangular wave signal for modulation, and outputs the generated signal to the oscillator 16. The oscillator 16 is a voltage control oscillator for controlling an oscillating frequency by voltage. The oscillator 16 modulates the triangular wave signal for modulation generated by the signal generator 15 into a millimeter-wave (e.g. 76.5 GHz) signal, and outputs the modulated signal to the switch 17.

The switch 17 connects between the oscillator 16 and one of the transmission antennas 11a to 11d. Switching is performed in a prescribed cycle (e.g. 5 msec), which switches the transmission antenna for connection to the oscillator 16 in the same cycle. That is, the transmission antenna for outputting a transmission wave is switched by the switch 17.

The signal processor 18 is a computer including a CPU and a memory that are not shown in the figure, having a Fourier transformer 18a, a peak extraction part 18b, a horizontal angle derivation part 18c, a vertical angle derivation part 18d, a pairing part 18e, a distance/relative velocity derivation part 18f, a bad environment determination part 18g, a continuity determination part 18h, a filter 18i, and a grouping part 18j.

The Fourier transformer 18a performs frequency analysis of the digital signal after conversion by the AD converter 14, by use of a DSP (Digital Signal Processor) circuit that is not shown in the figure. Specifically, the Fourier transformer 18a performs Fast Fourier Transform (FFT) to the digital signal so as to generate FFT data where the digital signal is decomposed for each frequency.

The peak extraction part 18b extracts as a peak signal the signal whose level exceeds a prescribed threshold among the signals decomposed for each frequency in FFT data.

The horizontal angle derivation part 18c derives angle information about a target in the horizontal direction to the road surface by use of a prescribed angle estimation system. Specifically, the horizontal angle derivation part 18c derives angle information about a target in the horizontal direction to the road surface, from the peak signal based on the reception signal received by the reception antennas 12a to 12d. The horizontal angle derivation part 18c outputs the derived angle information about the target in the horizontal direction to the road surface to the distance/relative velocity derivation part 18f.

The vertical angle derivation part 18d derives the angle information about the target in the vertical direction to the road surface. Specifically, the vertical angle derivation part 18d derives the height information showing whether the target is an upper object existing above the road surface, or a lower object existing on the road surface.

The pairing part 18e derives pair data by pairing a peak signal in an UP section and a peak signal in a DOWN section.

The distance/relative velocity derivation part 18f derives a longitudinal distance and a relative velocity. Specifically the distance/relative velocity derivation part 18f derives, by use of Formula (1) below, a longitudinal distance of the target corresponding to the pair data derived by the pairing part 18e. In addition, the distance/relative velocity derivation part 18f derives, by use of Formula (2) below, a relative velocity of the target corresponding to the pair data.

$$R = \frac{(f_{up} + f_{dn}) \times c}{2 \times (4 \times \Delta F \times f_m)} \quad (1)$$

$$V = \frac{(f_{up} - f_{dn}) \times c}{4 \times f_0} \quad (2)$$

In the formulas, R represents a distance; $f_{up}$ represents a frequency corresponding to a peak signal in an UP section; $f_{dn}$ represents a frequency corresponding to a peak signal in a DOWN section; and c represents the velocity of light (radio waves). In the formula, $\Delta F$ represents a frequency deviation width; and $f_m$ represents a repeating frequency of a modulation wave. In the formula, V represents a relative velocity; and $F_0$ represents the center frequency of a transmission wave.

Calculation by use of trigonometric functions with the information of the longitudinal distance and the angle in the horizontal direction derived by the horizontal angle derivation part 18c derives the lateral distance of the target corresponding to the pair data.

The bad environment determination part 18g determines, by use of the pair data derived by the pairing part 18e, whether the environment where the vehicle CR is traveling is a bad environment or not. The processing for determining a bad environment is detailed later.

The continuity determination part 18h determines whether there is a temporally continuous relation between the pair data made up by pairing in the target detection processing this time and the pair data fixed by pairing in the previous target detection processing.

The filter 18i performs a filtering processing to the longitudinal distances, the relative velocities, the lateral distances and the signal level values in two sets of the pair data having a temporally continuous relation each other.

The grouping part 18j performs a grouping processing for making a group with plural target information corresponding to one object.

<1-2. Configuration of Antenna>

Figure 3:
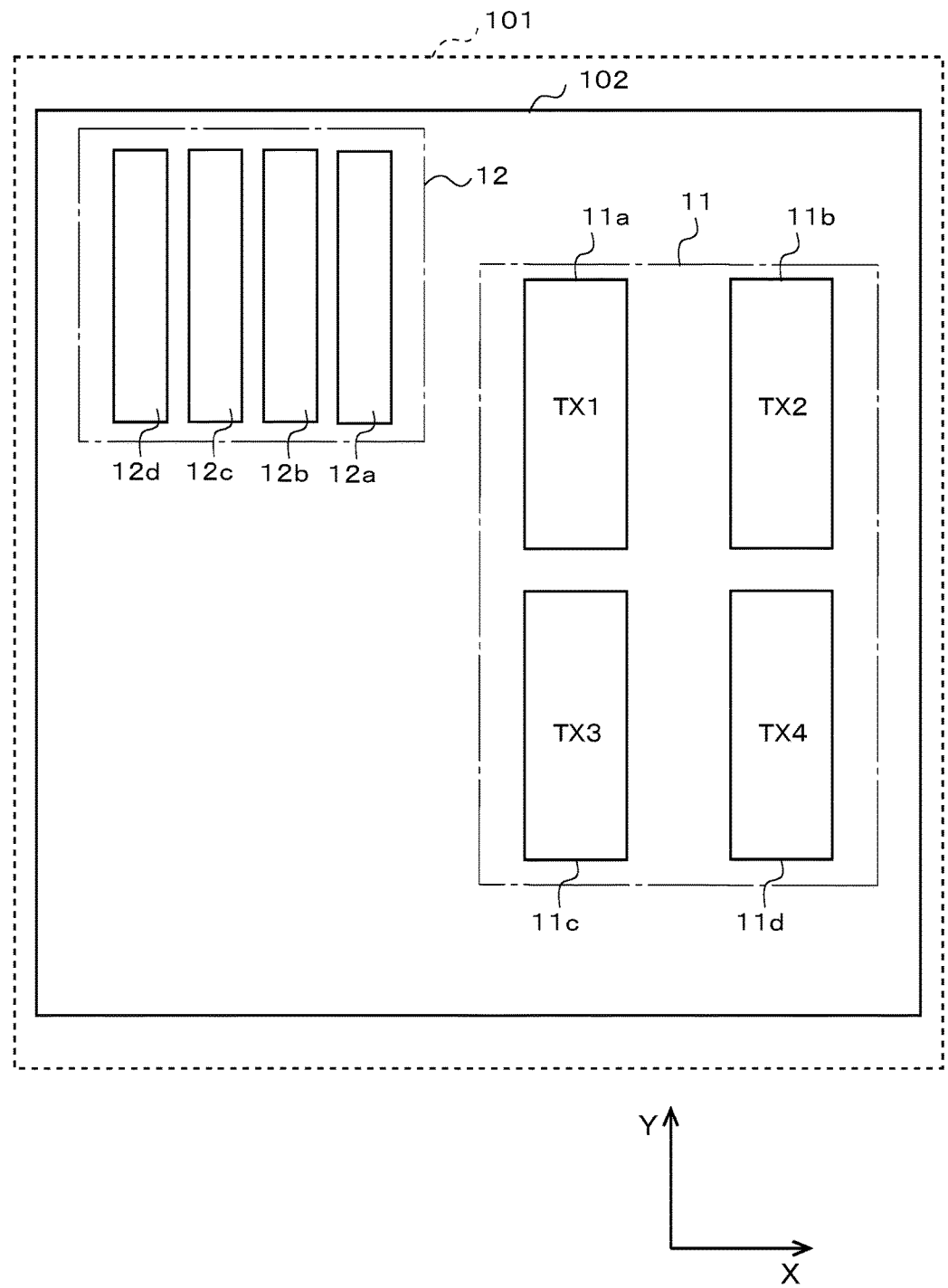
FIG. 3 shows a block diagram of an antenna.

Next, the configuration of the antenna 101 is detailed based on FIG. 3. FIG. 3 shows the schematic configuration of the antenna 101. In FIG. 3, a Y-axis direction represents the up-down direction (vertical direction) of the vehicle CR equipped with the radar apparatus 10; and an X-axis direction represents the right-left direction (vehicle-width direction) of the vehicle CR. In the embodiment, a plus Y-axis direction corresponds to the upper direction to the vehicle CR; and a plus X-axis direction corresponds to the leftward direction to the vehicle CR.

The antenna 101 includes the transmission antenna 11 and the reception antenna 12 on the substrate surface of a dielectric substrate 102. The transmission antenna 11 has the four transmission antennas 11a to 11d. Each of the transmission antennas 11a to 11d is arranged so that the longitudinal direction of the antenna corresponds to the up-down direction (Y-axis direction). The configuration of the transmission antenna 11 is that two transmission antennas are arranged in parallel as one set and the two sets of the transmission antennas are arranged in the upper-lower direction (Y-axis direction) so that each set is arranged in a lower or an upper line. That is, the transmission antennas 11a to 11d are arranged in two lines and two rows so that the longitudinal direction of the antennas corresponds to the up-down direction.

Further, each of the transmission antennas 11a to 11d includes a plurality of antenna elements set on a plurality of transmission lines not shown in the figure. The transmission line transmits a signal to the antenna element; and the antenna element outputs a transmission wave based on the transmission signal.

The reception antenna 12 has the four reception antennas 12a to 12d. Each of the reception antennas 12a to 12d is arranged so that the longitudinal direction of the antenna corresponds to the up-down direction (Y-axis direction), and the four reception antennas are in parallel in the right-left direction (X-axis direction). Further, each of the reception antennas 12a to 12d also includes a plurality of antenna elements set on a plurality of transmission lines not shown in the figure. The antenna element of the reception antenna 12 receives a reflection wave and transmits a reception signal to the transmission line.

The next explanation is about the transmission range by each of the transmission antennas 11a to 11d of the transmission antenna 11. Each of FIG. 4 and FIG. 5 shows the transmission ranges of transmission waves output by the transmission antenna 11.

Figure 4:
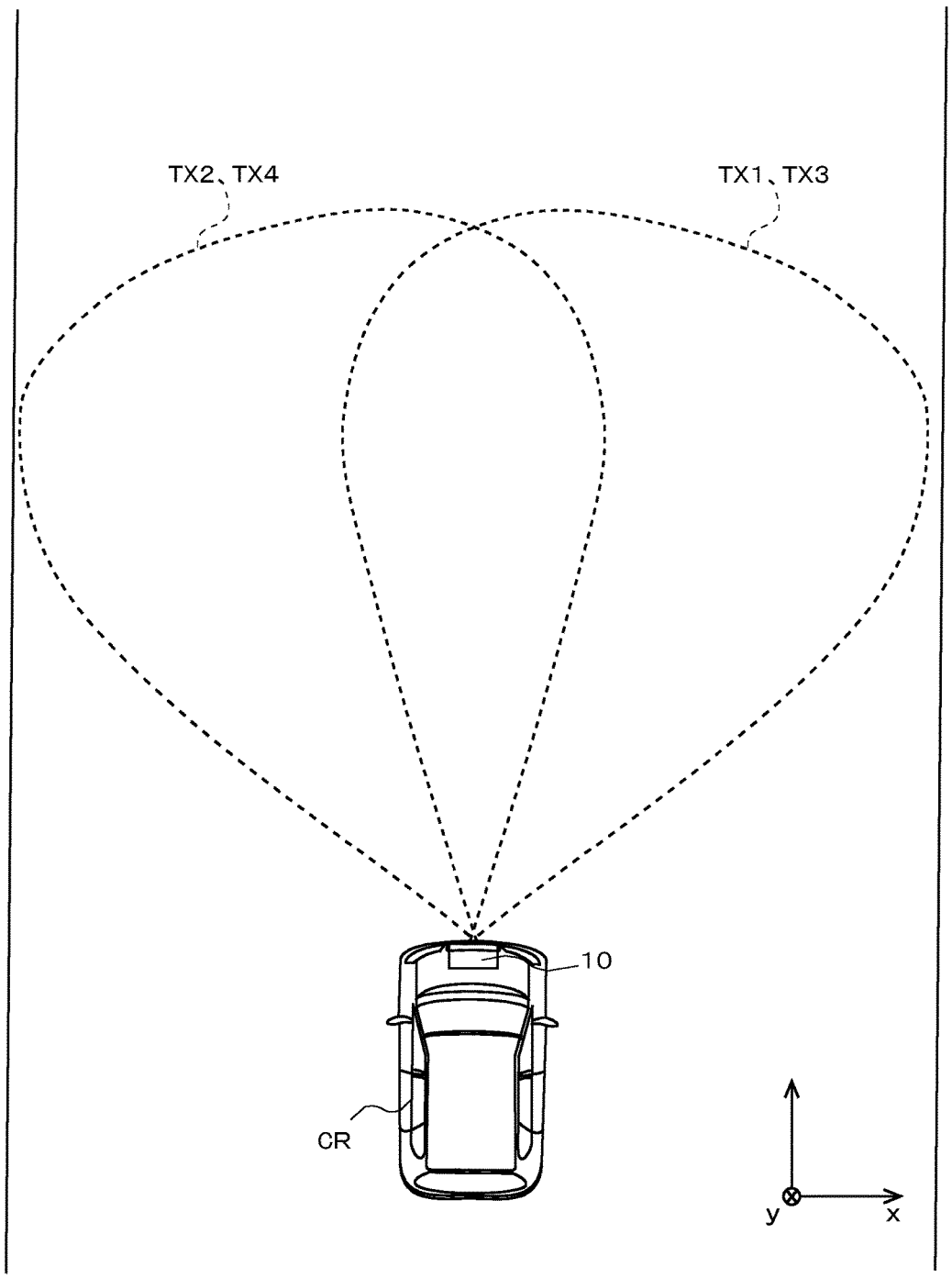
FIG. 4 shows transmission ranges of transmission waves.
Figure 5:
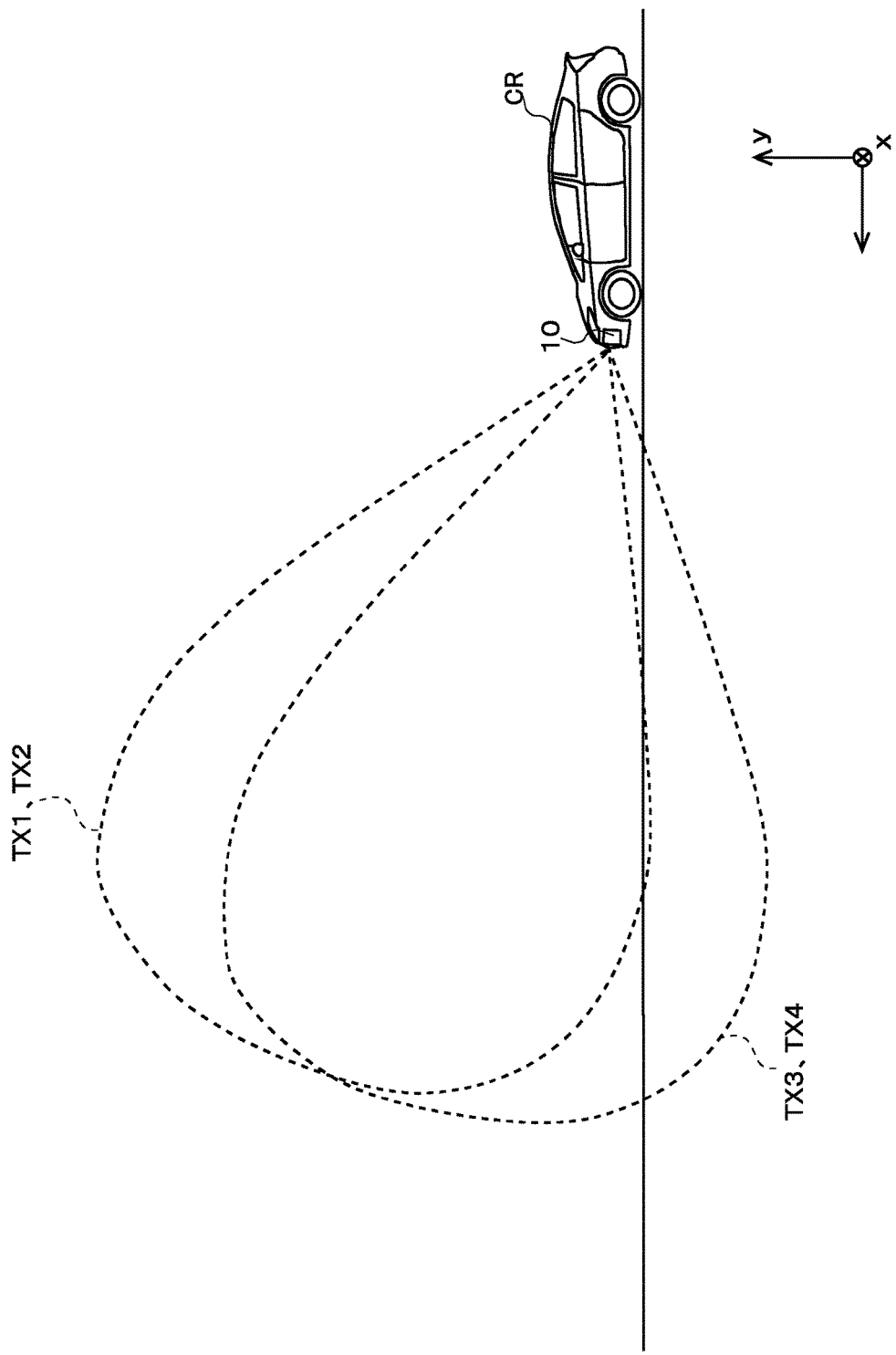
FIG. 5 shows other transmission ranges of transmission waves.

FIG. 4 shows the transmission ranges by the transmission antennas 11a to 11d in the horizontal direction to the road surface. Hereafter, the transmission waves respectively output by the transmission antennas 11a to 11d are called TX1, TX2, TX3 and TX4 in that order.

As shown in FIG. 4, the antennas 11a and 11c respectively output the transmission wave TX1 and the transmission wave TX3 in the transmission ranges centering on the lines inclined with a prescribed angle to the right direction from the traveling direction of the vehicle CR. The antennas 11b and 11d respectively output the transmission wave TX2 and the transmission wave TX4 in the transmission ranges centering on the lines inclined with a prescribed angle to the left direction from the traveling direction of the vehicle CR.

That is, in the embodiment, the antennas arranged on the same side in the vertical direction (Y-axis direction) have the transmission ranges in the same horizontal direction to the road surface. That is, in the example shown in FIG. 3, the transmission ranges of the transmission wave TX1 and the transmission wave TX3 output respectively by the antenna 11a and the antenna 11c are in the same horizontal direction to the road surface; the transmission ranges of the transmission wave TX2 and the transmission wave TX4 output respectively by the antenna 11b and the antenna 11d are in the same horizontal direction to the road surface.

FIG. 5 shows the transmission ranges by the transmission antennas 11a to 11d in the vertical direction. As shown in FIG. 5, the antennas 11a and 11b respectively outputs the transmission wave TX1 and the transmission wave TX2 in the transmission ranges centering on the lines inclined with a prescribed angle to the upward direction (plus Y-axis direction) from the horizontal direction to the road surface. The antennas 11c and 11d respectively outputs the transmission wave TX3 and the transmission wave TX4 in the transmission ranges centering on the lines substantially the same as the horizontal direction to the road surface, or the lines inclined with a prescribed angle to the upward direction (plus Y-axis direction) from the horizontal direction. Here, the transmission ranges of the transmission waves TX3 and TX4 are set below (minus Y-axis direction) the transmission ranges of the transmission waves TX1 and TX2.

That is, in the embodiment, the antennas arranged on the same side in the horizontal direction (X-axis direction) have the transmission ranges in the same vertical direction. That is, in the example shown in FIG. 3, the transmission ranges of the transmission wave TX1 and the transmission wave TX2 output respectively by the antenna 11a and the antenna 11b are in the same horizontal direction to the road surface; the transmission ranges of the transmission wave TX3 and the transmission wave TX4 output respectively by the antenna 11c and the antenna 11d are in the same horizontal direction to the road surface.

As above, the transmission antenna 11 in the embodiment includes the four transmission antennas 11a to 11d arranged in two lines upper and lower, and two rows right and left.

Among the transmission antennas 11a to 11d, the antennas 11a and 11c arranged on the right side in the traveling direction respectively output the transmission wave TX1 and the transmission wave TX3 in the transmission ranges that are on the right side from the traveling direction; the antennas 11b and 11d arranged on the left side respectively output the transmission wave TX2 and the transmission wave TX4 in the transmission ranges that are on the left side from the traveling direction. The transmission ranges of the transmission wave TX1 and the transmission wave TX2 respectively output by the antennas 11a and 11b arranged on the upper line are above the transmission ranges of the transmission wave TX3 and the transmission wave TX4 output respectively by the antennas 11c and 11d arranged on the lower line. The antennas arranged on two rows right and left determines the folding of a phase, and the antennas arranged on two lines upper and lower derives height information about an upper object.

<1-3. Whole Processing>

Figure 6:
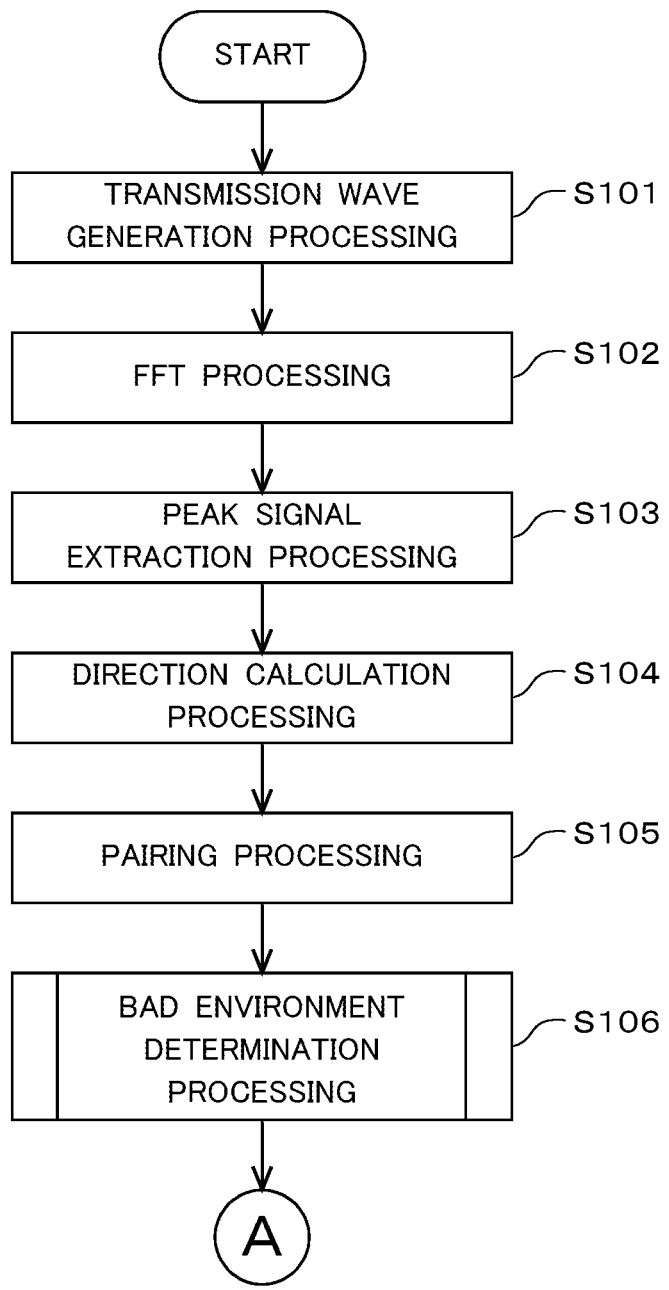
FIG. 6 shows a flowchart for a target derivation processing.
Figure 7:
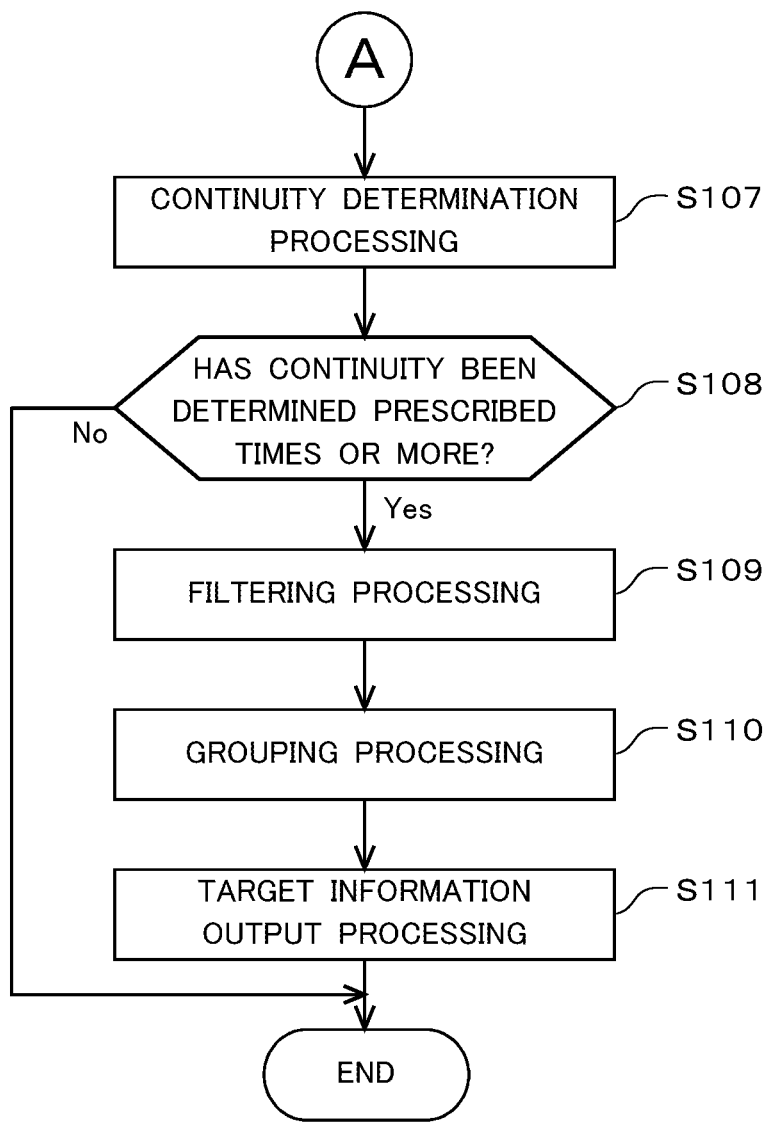
FIG. 7 shows another flowchart for the target derivation processing.

Next, the processing on the radar apparatus 10 for deriving the target information is explained. Each of FIG. 6 and FIG. 7 shows the flowchart of the processing on the radar apparatus 10 for deriving the target information.

First, the signal processor 18 controls the signal generator 15 to generate a transmission wave (step S101). That is, the transmission wave corresponding to a transmission signal is generated. The generated transmission wave is output outside the vehicle CR by one of the transmission antennas 11a to 11d that is connected to the switch 17.

Figure 8:
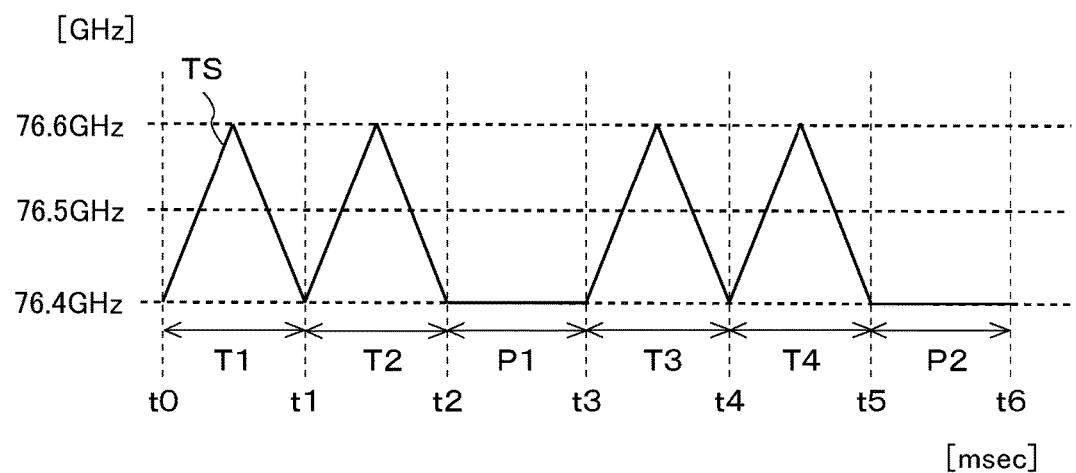
FIG. 8 shows timing for outputting a transmission wave.

The following explanation based on FIG. 8 is about the timing at which each of the transmission antennas 11a to 11d outputs a transmission wave. FIG. 8 shows the timing of the transmission wave being output by each of the transmission antennas 11a to 11d. In FIG. 8, the vertical axis represents frequency [GHz]; the horizontal axis represents time [msec]. A transmission signal TS in the figure is a signal that repeats constant frequency changing in the range of 200 MHz in the manner where a frequency of the signal centering on, for example, 76.5 GHz, increases to a prescribed first frequency (for example, 76.6 GHz), and decreases to a prescribed second frequency (for example, 76.4 GHz).

The period between a time t0 and a time t1 is called a first transmission period T1; the period between the time t1 and a time t2 is called a second transmission period T2. In the first transmission period T1, a transmission wave is output by the transmission antenna 11a; in the second transmission period T2, a transmission wave is output by the transmission antenna 11b. That is, in the first transmission period T1, the switch 17 connects to the transmission antenna 11a, and thereby the transmission wave TX1 is output by the transmission antenna 11a. Then, at the time t1, the switch 17 changes the connection from the transmission antenna 11a to the transmission antenna 11b. In the second transmission period T2, the transmission wave TX2 is output by the transmission antenna 11b.

In the period between the time t2 and a time t3, the signal processor 18 derives a target based on the reflection waves generated due to reflection by the target, from the transmission wave TX1 and the transmission wave TX2 respectively output in the first transmission period T1 and the second transmission period T2 by the transmission antennas 11a and 11b. The period between the time t2 and the time t3 is called a first processing period P 1.

The period between the time t3 and a time t4 is called a third transmission period T3; the period between the time t4 and a time t5 is called a fourth transmission period T4. In the third transmission period T3, a transmission wave is output by the transmission antenna 11c; in the fourth transmission period T4, a transmission wave is output by the transmission antenna 11d. That is, in the third transmission period T3, the switch 17 connects to the transmission antenna 11c, and thereby the transmission wave TX3 is output by the transmission antenna 11c. Then, at the time t4, the switch 17 changes the connection from the transmission antenna 11c to the transmission antenna 11d. In the fourth transmission period T4, the transmission wave TX4 is output by the transmission antenna 11d.

In the period between the time t5 and a time t6, the signal processor 18 derives a target based on the reflection waves generated due to reflection by the target, from the transmission wave TX3 and the transmission wave TX4 respectively output in the third transmission period T3 and the fourth transmission period T4 by the transmission antennas 11c and 11d. The period between the time t5 and the time t6 is called a second processing period P2.

The period covering all from the first transmission period T1 to the fourth transmission period T4, and the first processing period P1 and the second processing period P2, that is, the period from the time t0 to the time t6, is deemed as one cycle for a target derivation processing, and the same processing is repeated hereafter.

As above, the transmission antennas 11a to 11d respectively output the transmission waves TX1 to TX4. Then, a reflection wave is generated when the target reflects the output transmission wave, and the reception antenna 12 receives the generated reflection wave. After the reception antenna 12 receives the reflection wave, the mixer 13 mixes the transmission signal and the reception signal corresponding to the reception wave to generate a beat signal that is a signal showing the difference between the transmission signal and the reception signal. Then, the AD converter 14 converts the beat signal that is an analog signal into a digital signal, and transmits the converted digital signal to the signal processor 18.

Figure 9A:
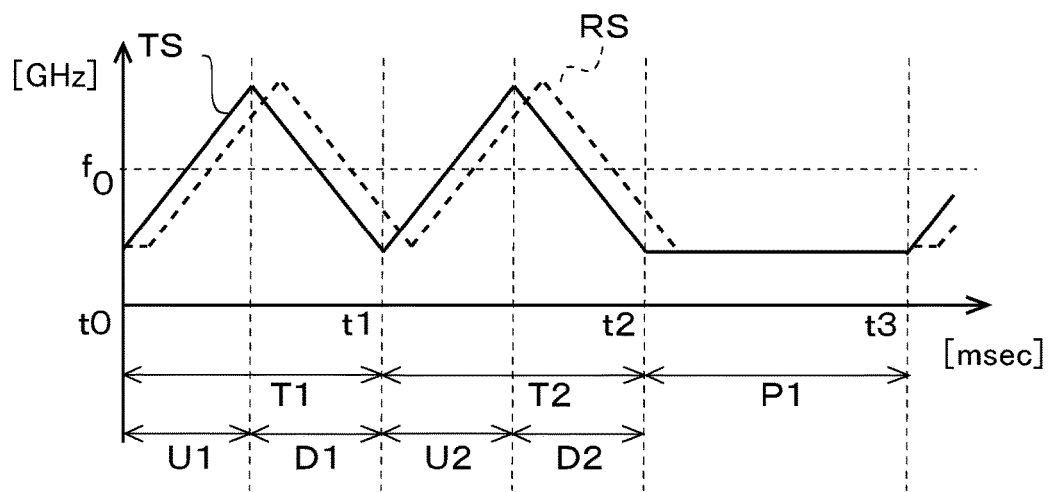
FIG. 9A shows signal waveforms of a transmission signal and a reception signal in an FM-CW method.
Figure 9B:
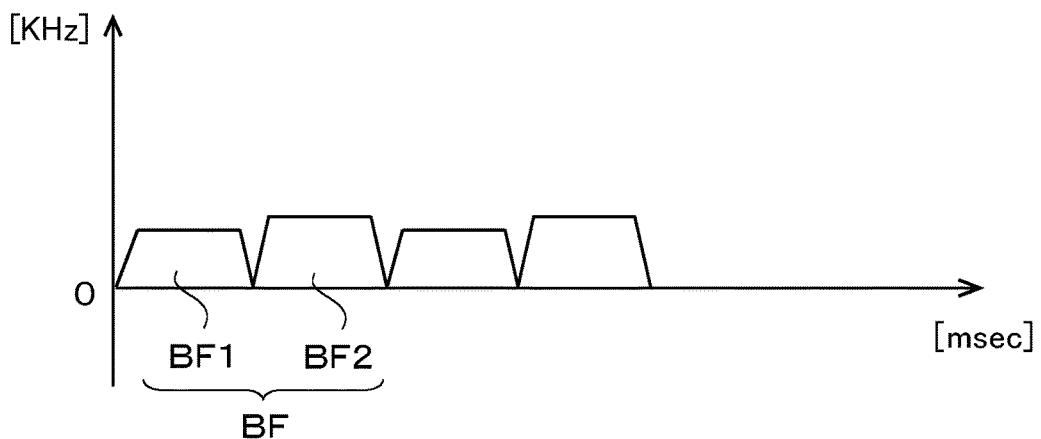
FIG. 9B shows a beat frequency.
Figure 9C:
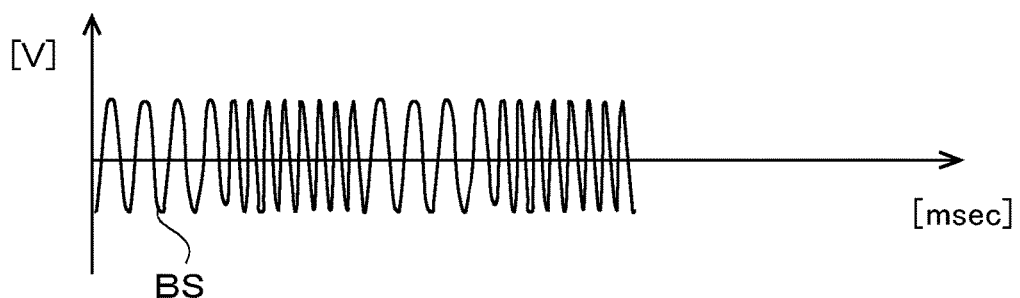
FIG. 9C shows a beat signal corresponding to the beat frequency.

Next, the method for generating the beat signal is concretely explained. FIG. 9A to FIG. 9C show the method for generating the beat signal. FIG. 9A to FIG. 9C show an example of an FM-CW (Frequency Modulated Continuous Wave) signal processing method. In the embodiment, the FM-CW method is used for explanation. However, the method is not limited to the FM-CW method. Any other method is available as long as the method derives a target by combining a plurality of sections, such as an UP section in which a frequency of the transmission signal increases and a DOWN section in which the frequency decreases.

In the embodiment, as explained above, the period covering all from the first transmission period T1 to the fourth transmission period T4, and the first processing period P1 and the second processing period P2 is deemed as one cycle for the target derivation processing. In FIG. 9A to FIG. 9C, the processing especially in the first transmission period T1 and the second transmission period T2 and the first processing period P1 is explained. After the first processing period P1, the same processing is performed in the third transmission period T3 and the fourth transmission period T4 and the second processing period P2.

FIG. 9A shows the signal waveforms of the transmission signal TS and a reception signal RS in the FM-CW method. The vertical axis represents frequency [GHz]; the horizontal axis represents time [msec]. The transmission signal TS repeats constant frequency changing in the range of 200 MHz in the manner where a frequency of the signal centering on a frequency $f_o$, (for example, 76.5 GHz) increases to a prescribed frequency (for example, 76.6 GHz), and decreases to another prescribed frequency (for example, 76.4 GHz). As above, the transmission signal TS has a section in which a frequency increases to a prescribed frequency and another section in which a frequency decreases to another prescribed frequency. In the Description, the section in which a frequency increases is called "UP section;" the section in which a frequency decreases is called "DOWN section." In the example of FIG. 9A, a section U1 and a section U2 correspond to the UP section; a section D1 and a section D2 correspond to the DOWN section.

A target reflects the transmission wave output by the transmission antenna 11, and the reception antenna 12 receives the reflection wave. Then, the reception signal RS corresponding to the reflection wave is transmitted to the mixer 13. The reception signal RS, like the transmission signal TS, has also a section in which a frequency increases to a prescribed frequency, and another section in which a frequency decreases to another prescribed frequency.

In accordance with the distance from the vehicle CR to the target, the reception signal RS is delayed compared to the transmission signal TS. Further, in the case where the velocity of the vehicle CR and the velocity of the target are different, a Doppler Effect causes Doppler Shift on the reception signal RS by the difference from the transmission signal TS.

FIG. 9B shows a beat frequency. The vertical axis represents frequency [kHz]; the horizontal axis represents time [msec]. The beat frequency is derived based on the difference between the transmission signal TS and the reception signal RS in the UP section, and the difference between the transmission signal TS and the reception signal RS in the DOWN section. In an example, a beat frequency BF1 is derived in the section U1; a beat frequency BF2 is derived in the section D1. As above, a beat frequency is derived in each of the sections.

FIG. 9C shows the beat signal corresponding to the beat frequency. In the figure, the vertical axis represents amplitude [V]; the horizontal axis represents time [msec]. As shown in FIG. 9C, a beat signal BS that is an analog signal is generated as a signal corresponding to the beat frequency. The beat signal BS is converted into a digital signal by the AD converter 14.

FIG. 9C shows the beat signal BS corresponding to the received reception signal RS reflected at one reflection point. In the case where the reception antenna 12 receives a plurality of reflection waves that are generated from the transmission wave due to reflection at a plurality of reflection points, the signals corresponding to the plurality of reflection waves are detected as the reception signal RS. In the beat signal BS of this case, the differences between the plurality of reception signals RS and the transmission signal TS are combined.

In FIG. 6 back again, as the next step, the Fourier transformer 18a performs FFT to the beat signal that is a digital signal (step S102). Specifically, the Fourier transformer 18a performs FFT to each of the beat signals in the UP sections and the DOWN sections. By performing this step, the signal processor 18 obtains FFT data including phase information and a signal level value for each frequency for the beat signal in each of the UP section and the DOWN section. The FFT data is obtained for each of the reception antennas 12a to 12d.

Next, the peak extraction part 18b extracts a peak signal to derive a target based on the FFT data (step S103). Specifically, the peak extraction part 18b extracts as a peak signal the signal whose signal level exceeds a prescribed threshold in the FFT data. The peak extraction processing is performed each of the UP sections and the DOWN sections.

In the peak extraction processing, the peak extraction part 18b also performs a history peak extraction processing and a static object peak extraction processing. The history peak extraction processing is to extract a peak signal (history peak signal) having temporal continuity with the target derived in the past target derivation processing among the extracted peak signals. The static object peak extraction processing is to extract as a peak signal corresponding to a static object (static object peak signal) the peak signal in which the frequency difference between the peak signal in the UP section and the peak signal in the DOWN section corresponds to the velocity of the vehicle CR in each of the sections.

Each of the horizontal angle derivation part 18c and the vertical angle derivation part 18d performs a direction calculation processing based on the extracted peak signal in each of the UP sections and the DOWN sections (step S104).

The direction calculation processing is to derive angle information in the horizontal direction and the angle information in the vertical direction. The following explanation is about the processing for deriving these.

First, the horizontal angle derivation part 18c derives the angle information about a target in the horizontal direction to the road surface. As an angle estimation system for deriving angle information in the horizontal direction, for example, ESPRIT (Estimation of Signal Parameters via Rotational Invariance Techniques) is available. Specifically, the horizontal angle derivation part 18c calculates the eigenvalues and the eigenvectors of a correlation matrix based on the phase information of the reception signals of the reflection waves received by the reception antennas 12a to 12d respectively, so as to derive the angle information in the horizontal direction corresponding to the peak signals in the UP sections and the angle information in the horizontal direction corresponding to the peak signals in the DOWN sections. That is, angular resolution by ESPRIT or other system is performed to frequency peak signals individually in the UP sections and the DOWN sections, and angle information in the horizontal direction is derived based on the angle peak signals on the obtained angle spectra.

The frequency information of a peak signal corresponds to the information of the distance and the relative velocity of a target. In some case, the frequency information of one peak signal may include information about a plurality of targets. This case is seen, for example, when a peak signal at one frequency includes information about a plurality of targets that are at the same distance but different angles as the location information about targets to the vehicle CR. The location information of reflection waves from different angles are different each other. Thus, the horizontal angle derivation part 18c derives, based on phase information of each of reflection waves, a plurality of angle information in the horizontal direction included in one peak signal.

The vertical angle derivation part 18d derives the angle information about a target in the vertical direction to the road surface. The angle information in the vertical direction in the embodiment is height information of two values in terms of whether a target corresponds to an upper object existing above the road surface such as a road sign and whether a target corresponds to a lower object existing on the road surface. The method for deriving the angle information in the vertical direction is as follows: first, based on the target data at the time of transmission upward of the transmission wave TX1 or the transmission wave TX2 and the target data at the time of transmission downward of the transmission wave TX3 or the transmission wave TX4, to compare the reception levels of the peak signals having the same frequency and the same angle in the horizontal direction; next, in the case where the former reception level is greater than the latter reception level, to determine that the target is an upper object existing above the road surface, while in the case where the former reception level is smaller than the latter reception level, to determine that the target is an on-road object existing on the road surface. In the case where the target is an upper object, since there is no risk of collision with the target by the self-vehicle, the target is excluded from control targets.

As an angle estimation system for deriving the angle information in the vertical direction, for example, ESPRIT described above may be adopted. That is, the same as above, the vertical angle derivation part 18d calculates the eigenvalues and the eigenvectors of a correlation matrix based on the phase information of the reception signal of the reflection wave received by each of the reception antennas 12a to 12*d*, so as to derive the angle information corresponding to the peak signal in the UP sections and the angle information corresponding to the peak signal in the DOWN sections. The vertical angle derivation part 18*d* derives, based on the phase information of each of reflection waves, a plurality of angle information in the vertical direction included in one peak signal.

Next, the pairing part 18*e* performs a pairing processing for pairing a peak signal in the UP section and a peak signal in the DOWN section (step S105). Specifically, the pairing part 18*e* performs a history pairing processing for pairing history peak signals, a static object pairing processing for pairing static object peak signals, and other pairing processing for pairing other peak signals.

The history pairing processing is to pair a history peak signal in an UP section and its corresponding history peak signal in a DOWN section, which may be performed based on the calculation by use of Mahalanobis distance.

Specifically, prior to the installation of the radar apparatus 10 on the vehicle CR, peak signals in UP sections and peak signals in DOWN sections are paired in advance for testing purpose. Then, a plurality of normal pair data including pairs with correct combination and a plurality of miss pair data including pairs with erroneous combination are obtained. Then, by use of three parameters: "difference of values in signal level;" "difference of values in angle;" and "difference of values in signal level of angle spectra," between a peak signal in an UP section and a peak signal in a DOWN section in each of the normal pair data, average value in the plurality of normal pair data for each of the three parameters is derived and stored in a memory or the like.

When the signal processor 18 derives the target information after the installation of the radar apparatus 10 on the vehicle CR, the pairing part 18*e* derives Mahalanobis distance by use of the three parameters in terms of the combination between a history peak signal in an UP section and a history peak signal in a DOWN section, and the average values for each of the three parameters derived above. When the derived Mahalanobis distance is less than a prescribed value, the pairing part 18*e* determines that they correspond to each other as pair data, and pairs them.

The static object pairing processing is to pair a static object peak signal in an UP section and its corresponding static object peak signal in a DOWN section. As above, in the peak extraction processing, a static object peak signal in an UP section and a static object peak signal in a DOWN section having substantially the same relative velocity as the velocity of the vehicle CR are extracted. Then, in the static object pairing processing, the pairing part 18*e* pairs these extracted corresponding static object peak signals.

The peak signals extracted in the peak extraction processing but being not relevant to history peak signals or static object peak signals may correspond to a new target. Thus, the pairing part 18*e* performs the pairing processing to these peak signals. The pairing processing is performed based on, for example, calculation by use of a Mahalanobis distance.

Specifically, a Mahalanobis distance is derived by use of the three parameters in terms of the combination between a peak signal in an UP section and a peak signal in a DOWN section among all of the peak signals other than the history peak signals or the static object peak signals, and the average values indicated above for each of the three parameters stored in a memory or the like. Then, the pairing part 18*e* pairs the combination in which Mahalanobis distance is the shortest, as pair data corresponding to the new target derived this time.

However, the method by use of the following two parameters: "difference of values in angle;" and "difference of values in signal level of angle spectra," not the three parameters described above, may be adopted for deriving a Mahalanobis distance.

Next, the distance/relative velocity derivation part 18*f* derives a longitudinal distance and a relative velocity of the target. Specifically, the distance/relative velocity derivation part 18*f* derives a longitudinal distance of the target corresponding to the pair data by use of Formula (1) shown above, and derives a relative velocity of the target corresponding to the pair data by use of Formula (2) shown above. However, by use of the angle information in the horizontal direction derived by the horizontal angle derivation part 18*c*, the angle of the target in the horizontal direction corresponding to the pair data may be derived. Calculation by use of trigonometric functions with the derived information of a longitudinal distance and an angle in the horizontal direction may derive the lateral distance and the height of the target corresponding to the pair data.

Next, the bad environment determination part 18*g* performs a bad environment determination processing (step S106). Specifically, the bad environment determination part 18*g* searches static object pair data for each predetermined frequency among the pair data generated in the pairing processing (step S105), and derives the number of the sets of the static object pair data including a plurality of angle information. In accordance with the result, the bad environment determination part 18*g* determines whether the environment where the vehicle CR is traveling is a bad environment or not. A bad environment is the environment where the vehicle CR is traveling and that involves a high risk of deriving less reliable target information when the radar apparatus 10 installed on the vehicle CR derives a target. For example, a case of traveling inside a tunnel or on a truss bridge falls under the bad environment.

The bad environment determination part 18*g* also sets a bad environment flag that represents whether the environment is a bad environment or not as a result of the bad environment determination processing. When the determination result corresponds to the bad environment, the bad environment determination part 18*g* sets the bad environment flag on; when the determination result does not correspond to the bad environment, the bad environment determination part 18*g* sets the bad environment flag off. The bad environment determination processing is detailed later.

Next, the continuity determination part 18*h* performs a continuity determination processing for determining whether there is a temporally continuous relation between the current pair data made up by pairing in the target detection processing this time and the previous pair data fixed by pairing in the previous target detection processing (step S107). The case where there is a temporally continuous relation (continuity) between the two is the case, for example, where predictive pair data is generated through the prediction of the current pair data based on the previous pair data, and the differences of the lateral distances, the longitudinal distances and the relative velocities between the current pair data and the predictive pair data are equal to or less than prescribed values.

In the case where there is the continuity, the continuity determination part 18*h* determines that the target derived in the processing this time and the target derived in the previous processing are the same. In the case where there are plural candidate current pair data within the prescribed values, the continuity determination part 18*h* can determine that the current pair data having the smallest differences of the values from the predictive pair data is the data having temporally continuous relation with the previous pair data.

In the case where the differences of the values of the lateral distance, the longitudinal distances and the relative velocities between the current pair data and the predictive pair data exceed the prescribed values, the continuity determination part 18*h* determines that there is no temporally continuous relation (no continuity) between the current pair data and the previous pair data. In the case where it is determined that the current pair data has no continuity, the current pair data is deemed as the data derived for the first time in the target derivation processing this time (new pair data).

Next, the continuity determination part 18*h* determines whether the determination of having continuity has been made a prescribed times in a row (step S108). In the case where the determination of having continuity has been made a prescribed times in a row (Yes at the step S108), the continuity determination part 18*h* then performs the next processing for confirming that the current pair data and the previous pair data are the same and correspond to a true target, and for outputting the target information. In the case where the determination of having continuity has not been made a prescribed times in a row, or the case where the determination of having no continuity has been made (No at the step S108), the continuity determination part 18*h* ends the target derivation processing this time without moving into the next processing for confirming the target and outputting the target information.

In the case where the determination of having continuity has been made a prescribed times in a row, the filter 18*i* performs a filtering processing to the longitudinal distances, the relative velocities, the lateral distances and the signal level values between the current pair data and the predictive pair data (step S109). The filter 18*i* derives the pair data after the filtering processing (past-associated pair data) as the target information generated in the processing this time.

In an example, in the case where there is a temporally continuous relation between the two, the filter 18*i* performs weighing the lateral distance of the predictive pair data by use of the weighting value of 0.75, and weighing the lateral distance of the current pair data by use of the weighting value of 0.25, and then derives the total value of the two weighted values as the lateral distance of the past-associated pair data in the target derivation processing this time. Further, the filter 18*i* performs the similar filtering processing to the longitudinal distances, the relative velocities and the signal levels. Then, the filter 18*i* confirms the derived past-associated pair data as the current target information.

Next, in the case where a plurality of target information correspond to one object, the grouping part 18*j* performs a grouping processing for making a group (step S110). This corresponds to, for example, the case where when the transmission antenna 11 of the radar apparatus 10 emits transmission waves and the preceding vehicle reflects the transmission waves, there is a plurality of reflection waves to be received by the reception antenna 12. That is, the reception antenna 12 receives the reflection waves generated due to reflection at a plurality of reflection points of the same object. The signal processor 18 derives the target information based on the respective reflection waves. As a result, a plurality of target information that are different in location information are derived.

However, since the plurality of target information correspond to one vehicle, the plurality of target information shall be made in one group and deemed as the target information about the same object. Thus, the grouping part 18*j* deems that the plurality of target information having substantially the same relative velocity and also having the longitudinal distances and the lateral distances that are within prescribed ranges correspond to the same object, and performs a grouping processing for making a group of the plurality of target information corresponding to one target.

Then, the signal processor 18 outputs to the vehicle controller 20 the target information made into a group in the grouping processing of the step S110 (step S111). The output target information includes a bad environment flag. That is, the signal processor 18 outputs to the vehicle controller 20 the target information including the information of whether the environment is a bad environment or not. The signal processor 18 may give priority order to the target information to be output to the vehicle controller 20, and output the target information according to the priority order.

As explained above, the radar apparatus 10 derives the angle of the target based on the phase difference of the reception signals received by the plurality of reception antennas 12. The radar apparatus can detect a phase difference only in the range from minus 360° to plus 360°. As for the reception signal from the target existing at the angle causing the phase difference exceeding the range, the phase difference is converted into another phase difference within the range for detection. Thus, in some case, the angle estimated by the radar apparatus may be different from the angle at which the actual target exists. This phenomenon is called folding of a phase.

In an example, the radar apparatus performs an angle estimation, taking A (in the range from minus 360° to plus 360°) as a phase difference of reception signals in any of the following cases where the phase difference is A, A1 (A plus 360°) and A2 (A minus 360°). Thus, there is no difference among the three cases.

In the embodiment, as a measure against the folding of a phase, with two transmission antennas (transmission antennas 11*a* and 11*b*, transmission antennas 11*c* and 11*d*) set toward different transmission directions in the horizontal direction, it is determined whether or not the folding of a phase based on the angle of the target estimated from the phase difference and the reception level to each of the transmission antennas.

In a specific example, the difference between the following two values is derived: the signal level of the angle spectrum corresponding to the reception signal of the reflection wave generated due to reflection by a target, from the transmission wave transmitted from the transmission antenna 11*a*; and the signal level of the angle spectrum corresponding to the reception signal of the reflection wave generated due to reflection by the same target, from the transmission wave transmitted from the transmission antenna 1 1*b*. Then, the radar apparatus stores in advance the table showing a difference between the signal levels of the angle spectra and the actual angle of the target corresponding to the difference, and thereby derives the actual angle corresponding to the derived difference between the signal levels of the angle spectra based on the table. This allows the angle of the actually-existing target to be derived.

The processing against the folding of a phase may be performed at the time when the target information is confirmed in the filtering processing (step S109), or when the angle information in the horizontal direction is derived in the direction calculation processing (step S104).

<1-4. Bad Environment Determination Processing>

Figure 10:
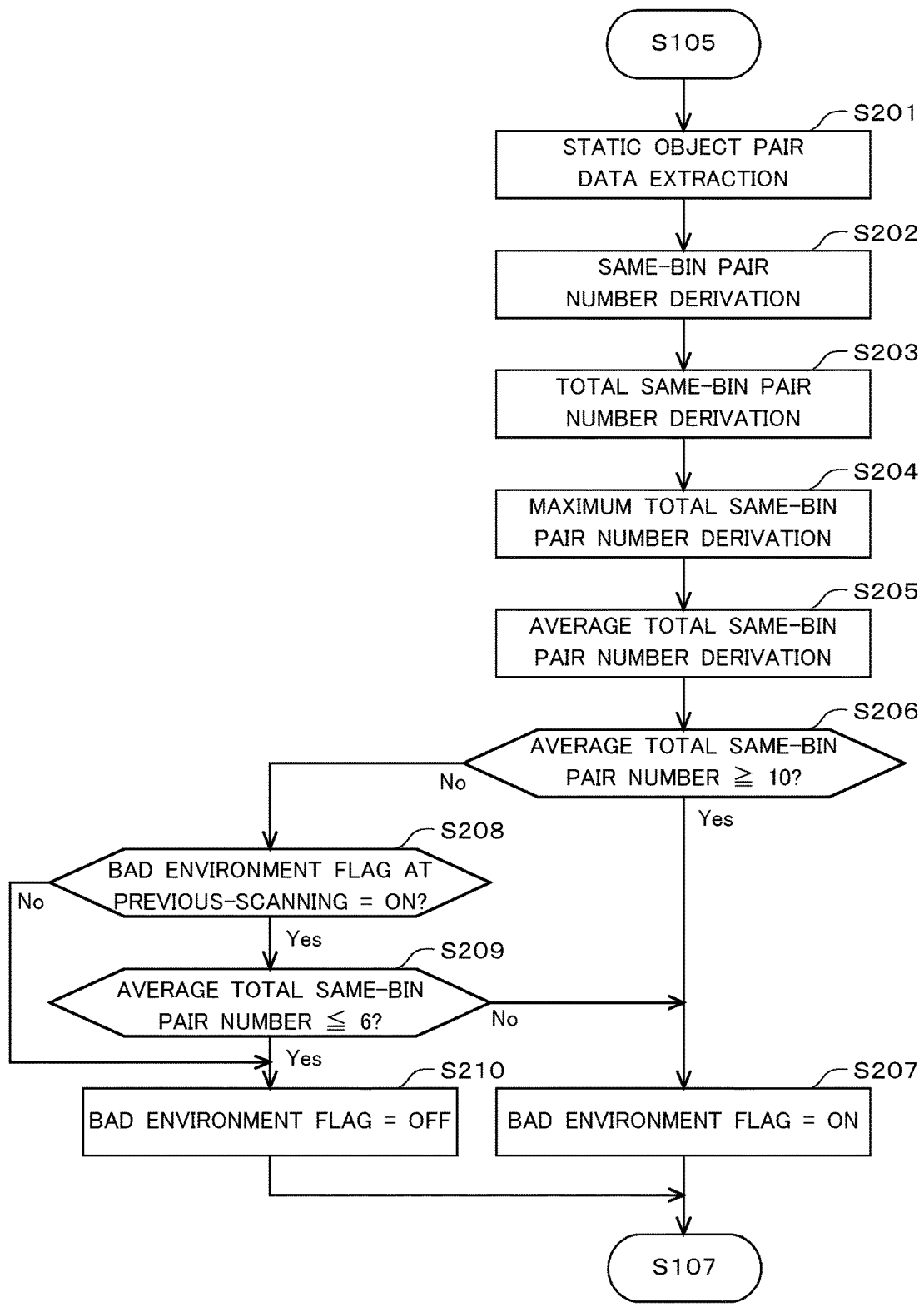
FIG. 10 shows a flowchart of a bad environment determination processing.

Next, the bad environment determination processing (step S106) of the embodiment is explained. FIG. 10 shows the flowchart of the bad environment determination processing.

The bad environment determination processing of the embodiment is to search static object pair data for each predetermined frequency, and derives the number of the sets of the static object pair data including a plurality of angle information in the horizontal direction. In other words, by assigning the value 1 to the case where the static object pair data having the same frequency but different horizontal angles (that is, having a plurality of horizontal angle information at the same distance) exists, the number of the frequencies having such different horizontal angles is derived. The every prescribed frequency is, for example, every 1BIN (1BIN corresponds to approx. 468 Hz). Then, it is determined whether or not the environment is a bad environment based on the number. That is, in the case where a plurality of static objects existing at the same distance have been detected, it can be estimated that the static objects have been detected based on the reflection waves from the wall or the ceiling of a tunnel or a truss bridge. Therefore, the environment of the case is determined as a bad environment. Hereafter, the bad environment determination processing is explained concretely.

First, among the pair data generated in the pairing processing (step S105), the bad environment determination part 18g extracts the static object pair data (step S201). That is, since the wall or the ceiling of a tunnel or a truss bridge that generally falls under the bad environment is a static object, only the static object pair data other than the moving object pair data indicating a preceding vehicle or the like is to be extracted. The bad environment determination part 18g compares the velocity of the vehicle CR and the relative velocity of the target corresponding to each of the pair data derived by the distance/relative velocity derivation part 18f, and determines whether each of the pair data is static object pair data or not based on the comparison result.

Then, the bad environment determination part 18g derives a same-BIN pair number from the all of the extracted static object pair data (step S202). The same-BIN pair number is the number of the frequencies of the static object pair data having a plurality of angle information in the horizontal direction. In other words, the same-BIN pair number is the number of the BINs each of which includes a plurality of static object pair data. First, the plurality of static object pair data are angle-decomposed in the horizontal direction. Here, the frequencies of the angle-decomposed static object pair data each of which includes a plurality angle information are to be counted, while the frequencies of the static object pair data each of which includes only one set of angle information are not to be counted.

Next, the method for deriving the same-BIN pair number is explained based on a figure. FIG. 11 shows an example list of the extracted static object pair data. FIG. 11 shows only the static object pair data extracted from the all of pair data including moving object pair data, and a number such as Pair 1, Pair 2, etc. is assigned to each of the static object pair data for convenience. In each pair, frequency information and horizontal angle information are associated. Here is an example. The frequency information "fu1-fd1" represents that the peak signal whose frequency (BIN) in an UP section is fu1 and the peak signal whose frequency (BIN) in a DOWN section is fd1 make a pair. Further, the horizontal angle information "θu11-θd11" represents that the peak signal whose horizontal angle in an UP section is θu11 and the peak signal whose horizontal angle in a DOWN section is θd11 make a pair. That is, Pair 1 is the peak signal whose frequency (BIN) is "fu1-fd1" and whose angle information is "θu11-θd11." A type shows whether the peak signal corresponds to static object pair data or moving object pair data. FIG. 11 showing a list after the extraction of static object pair data has only static object pair data.

Then, the same-BIN pair number is derived by use of the static object pair data where frequency information and horizontal angle information are associated. Specifically, by use of a certain pair of static object pair data as a reference, whether any set of static object pair data having the same frequency exist is searched among other static object pair data. That is, whether any other static object pair data having the same frequency information exist or not is searched. The static object pair data having the same frequency information are the static object pair data derived through the angle decomposition performed to the pair data having the same frequency information.

In the case where there is another set of the static object pair data having the same frequency information, the value "1" is assigned as "same-BIN pair number" corresponding to the frequency. That is, in the case where there are a plurality of static object pair data at the same frequency including the referenced static object pair data, the value "1" is assigned as the "same-BIN pair number" of the frequency. In the case where there is no static object pair data at the same frequency other than the referenced static object pair data, the value "0" is assigned as the "same-BIN pair number" of the BIN.

This derivation method is explained based on the example in FIG. 11. In the case where Pair 1 is adopted as a reference of the static object pair data, whether or not there is another static object pair data having the frequency information "fu1-fd1" that is the same frequency as Pair 1 in all other static object pair data including Pair 2, Pair 3, etc., is searched. In the case of the example in FIG. 11, since the frequency information of Pair 2 is "fu1-fd1," it is determined that there is another static object pair data having the same frequency information. Thereby, the value "1" is assigned as the "same-BIN pair number" corresponding to the frequency "fu1-fd1."

In the case where Pair 3 is adopted as a reference of the static object pair data, whether or not there is another static object pair data having frequency information "fu2-fd2" that is the same frequency as Pair 3 in all other static object pair data including Pair 4, Pair 5, etc., is searched. In the case of the example in FIG. 11, since there is no other static object pair data having the same frequency information, the value "0" is assigned as the "same-BIN pair number" corresponding to the frequency "fu2-fd2."

As above, in the case where there are a plurality of static object pair data at the same frequency, the value "1" is assigned as the "same-BIN pair number" corresponding to the frequency; in the case where there is only one static object pair data, the value "0" is assigned as the "same-BIN pair number" corresponding to the frequency. The same processing is repeated to all of the static object pair data so as to derive the value of "same-BIN pair number" corresponding to each of all frequencies.

FIG. 12 shows a list regarding the "same-BIN pair number" derived by use of the example in FIG. 11. FIG. 12 shows that at each of the frequencies "fu1-fd1," "fu3-fd3" and "fu5-fd5," there are a plurality of static object pair data; at each of the frequencies "fu2-fd2," "fu4-fd4" and "fu6-fd6," there is only one static object pair data.

In FIG. 10 back again, after deriving all of the "same-BIN pair numbers," the bad environment determination part 18g derives a "total same-BIN pair number" that is the sum of the "same-BIN pair numbers" (step S203). According to FIG. 12, if the "same-BIN pair numbers" at all of the frequencies after "fu6-fd6" are "0," the values of the "same- BIN pair number" of "1" at "fu1-fd1," "fu3-fd3" and "fu5-fd5" are summed to derive the "total same-BIN pair number," and thereby the value "3" is derived. The processing for deriving the total same-BIN pair number is performed for each scanning, and the latest values of the total same-BIN pair numbers derived at 10 times of scanning are stored in a memory or the like. Here, one scanning is, based on FIG. 8, the performance in the period from t0 to t3, or from t3 to t6. Or, the period from t0 to t6 may be deemed as one scanning period.

Next, the bad environment determination part 18g derives the maximum total same-BIN pair number (step S204). The maximum total same-BIN pair number is the maximum value among the latest 10 values of the total same-BIN pair numbers derived at 10 times of scanning That is, the bad environment determination part 18g reads out for comparison the latest 10 values stored in a memory or the like, of the total same-BIN pair numbers that are derived at 10 times of scanning, and thereby derives the maximum value as the maximum total same-BIN pair number.

Next, the derivation of the maximum total same-BIN pair number is explained based on FIG. 13. FIG. 13 shows the total same-BIN pair numbers derived at every scanning up to 10 times of scanning including the scanning this time, and the maximum total same-BIN pair numbers at every scanning In FIG. 13, "No. of times" shows the number of times of scanning That is, "1" means the first scanning; "2" means the second scanning; and "n" means the n-th scanning "This time" shows the total same-BIN pair number derived at the scanning this time; "Previous time" shows the total same-BIN pair number derived at the previous scanning In the same manner, "2-times before" to "10-times before" respectively show the total same-BIN pair numbers derived at the scanning 2-times before to the scanning 10-times before. "Max" shows the maximum total same-BIN pair number. "Avg" is explained later.

In the example of FIG. 13, the total same-BIN pair number derived at the first scanning is "3." Since this is the first scanning, there is no scanning as previous time up to 10-times before. Thus, the maximum total same-BIN pair number is "3." Next, the total same-BIN pair number derived at the second scanning is "7." From the previous scanning to the scanning 10-times before, there is only one value of "3" derived at the previous scanning as the total same-BIN pair number. Thus, in comparison with "3," the maximum total same-BIN pair number is "7." In the same manner, the maximum total same-BIN pair number derived at the third scanning is "7."

At the n-th (n>10) scanning, in comparison with the total same-BIN pair number derived at the latest 10 times of scanning including the scanning this time, the maximum total same-BIN pair number is "6." In the same manner, at the (n+1)-th scanning, the maximum total same-BIN pair number is "13"; at the (n+2)-th scanning, the maximum total same-BIN pair number is "15." As above, the maximum total same-BIN pair number is derived.

In FIG. 10 back again, next the bad environment determination part 18g derives an average total same-BIN pair number (step S205). The average total same-BIN pair number is derived by use of the average total same-BIN pair number derived at the previous scanning and the maximum total same-BIN pair number derived at scanning this time (step S204).

The derivation of the average total same-BIN pair number is explained. First, as a premise, the average total same-BIN pair number is derived at every scanning, and the derived average total same-BIN pair number is stored in a memory.

In the memory storing in advance an initial value at its initial state, the average total same-BIN pair number is overwritten every time the number is derived. That is, in the memory, an initial value is stored only at the first scanning; the average total same-BIN pair number derived at the previous scanning is stored in the case of the second scanning and after.

To derive an average total same-BIN pair number, first it is determined whether or not the value stored in the memory is an initial value. In the case of being an initial value, the maximum total same-BIN pair number derived at this scanning is taken as the average total same-BIN pair number. That is, in the case of Condition 1 below, Formula 3 is adopted.

Condition 1: Value stored in the memory=Initial value

Average total same-BIN pair number=Maximum total same-BIN pair number   Formula 3:

In the case where the value stored in the memory is not an initial value, the following two values are summed, and the derived value is deemed as the average total same-BIN pair number: the value obtained by multiplying the average total same-BIN pair number derived at the previous scanning by a prescribed coefficient C (0<C<1); and the value obtained by multiplying the maximum total same-BIN pair number derived at this scanning by another prescribed coefficient (1−C). That is, in the case of Condition 2 below, Formula 4 is adopted.

Condition 2: Value stored in the memory≠Initial value

Average total same-BIN pair number=C×Average total same-BIN pair number derived at previous scanning+(1−C)×Maximum total same-BIN pair number   Formula 4:

The value of the coefficient C is, for example, 0.99. However, the value is not limited to this, and may adequately be changed in accordance with the weighting ratio between the average total same-BIN pair number derived at the previous scanning and the maximum total same-BIN pair number derived at this scanning Here is an example for explanation based on FIG. 13, for deriving the average total same-BIN pair number in the case where C=0.99. "Avg" in FIG. 13 shows an average total same-BIN pair number derived at every scanning In the example of FIG. 13, since the total same-BIN pair number derived at the first scanning is "3," the maximum total same-BIN pair number is "3." Due to the first scanning, the value stored in the memory is an initial value (e.g. generally-impossible value such as the maximum value). Thus, the average total same-BIN pair number derived at the first scanning is "3" that is the same as the maximum total same-BIN pair number.

The maximum total same-BIN pair number derived at the second scanning is "7," and the average total same-BIN pair number derived at the previous scanning is "3." Then, by adopting Formula 4 above, "3.04" is derived as the average total same-BIN pair number. In the same manner, at the third scanning, "3.0796" is derived as the average total same-BIN pair number.

Also at the (n+1)-th scanning or after, the average total same-BIN pair number can be derived in the same manner. In an example, if the average total same-BIN pair number derived at the n-th scanning is "3," respectively at the (n+1)-th scanning, the (n+2)-th scanning, and the (n+3)-th scanning, "3.1," "3.219" and "3.34681" are derived respectively.

In FIG. 10 back again, next the bad environment determination part 18g determines whether or not the average total same-BIN pair number derived as above is equal to or above 10 (step S206). That is, in order to determine whether the static object is the wall or the ceiling of a tunnel or a truss bridge, it is determined whether or not the state where there are a plurality of static objects at the same distance is seen a prescribed times or more. The value is not limited to 10. Any other value is available as long as determination of the bad environment can be made.

In the case where the average total same-BIN pair number is 10 or above (Yes at the step S206), the bad environment determination part 18g determines that the driving environment of the vehicle CR is a bad environment, and sets the bad environment flag ON (step S207). That is, when the bad environment flag has been already set ON since the previous scanning, the flag is kept ON; when the flag has been set OFF since the previous scanning, the flag is changed to be ON.

In the case where the average total same-BIN pair number is less than 10 (No at the step S206), the bad environment determination part 18g determines whether the bad environment flag has been set ON or not (step S208). In the case where the average total same-BIN pair number is less than 10, the bad environment flag set at the previous scanning is to be confirmed while the possibility of being the bad environment is low, so as to avoid erroneous determination as much as possible.

In the case where the bad environment flag has been set OFF since the previous scanning (No at the step S208), the bad environment determination part 18g keeps the bad environment flag OFF at this scanning as well (step S210). That is, in the case where the average total same-BIN pair number at this scanning is less than 10 while it has been determined at the previous scanning that the environment is a bad environment, the bad environment flag is kept OFF because it is determined that the state where the environment is not a bad environment is kept.

In the case where the bad environment flag has been set ON since the previous scanning (Yes at the step S208), the bad environment determination part 18g determines whether the average total same-BIN pair number derived at this scanning is equal to or less than 6 (step S209). In the case where the average total same-BIN pair number is equal to or less than 6 (Yes at the step S209), the bad environment determination part 18g determines that the environment is not a bad environment, and turns the bad environment flag OFF (step S210). In the case where the average total same-BIN pair number is above 6 (No at the step S209), the bad environment determination part 18g keeps the bad environment flag ON (step S207).

That is, in the case where the average total same-BIN pair number is less than 10 while it is determined that the environment is a bad environment, there is a possibility that the number is temporally less than 10 even still under the bad environment. Thus, in the case where the average total same-BIN pair number is less than 10 but not so low, the determination of being a bad environment shall be continued, instead of instantly adopting determination of being not a bad environment. On the other hands, in the case where the average total same-BIN pair number is small enough, it is determined that the environment is not a bad environment.

In the embodiment, the value 6 is the reference value for whether to keep the determination of being a bad environment even if the average total same-BIN pair number is less than 10. However, the value is not limited to 6. Any other value is available as long as with the value it is determined that the environment is not a bad environment.

As above, in the embodiment, the number of the frequencies at which there are a plurality of static object pair data is derived, and in the case where the sum of the numbers is equal to or above a prescribed value, it is determined that the environment is a bad environment. That is, by counting the number of the groups each of which includes the plurality of static objects detected at the same distance but in the various angles, when the number of the groups detected at one scanning has been continuously equal to or above the prescribed value, it is highly possible that a plurality of reflection waves generated due to reflection at the wall or the ceiling of a tunnel, a truss bridge or the like are received. Thus, it is determined that the environment is a bad environment in the case where such reflection waves are received. Therefore, the information on whether or not the reliability of the detection result is low may be added to the detection result of targets, or the contents for output may be changed arbitrarily.

<2. Modification

The embodiment of the invention has been described so far. However, the invention is not limited to the embodiment described above, and may provide various modifications. Hereafter, these modifications are described. All embodiments including the embodiment described above and the embodiments to be described below can be arbitrarily combined with others.

In the method for deriving the average total same-BIN pair number of the embodiment described above, the average total same-BIN pair number derived at the previous scanning and the maximum total same-BIN pair number derived at the scanning this time are used for calculation based on a prescribed formula. However, the invention is not limited to this. In an example, the simple average value of the total same-BIN pair numbers derived at the latest 10 times of scanning may be used as the average total same-BIN pair number.

Here, this method is explained based on FIG. 13. At the first scanning, there is only this time value "3" as the total same-BIN pair number. Naturally, the calculation of the average total same-BIN pair number is 3/1=3. At the second scanning, there are two values of this time value "7" and the previous time value "3" as the total same-BIN pair number. The calculation of the average total same-BIN pair number is (7+3)/2=5. In the same manner, the calculation of the average total same-BIN pair number at the third scanning is (4+7+3)/3=4.667.

The calculation at the n-th times scanning or after is the same. The calculation of the average total same-BIN pair number at the n-th times scanning is (3+5+4+6+3+3+3+3+0+2+1)/10=3.3. In the same manner, the results of the calculation from the (n+1)-th times scanning to the (n+3)-th times scanning are respectively 4.5, 5.8, and 7.4.

This method is effective, for example, when the total same-BIN pair number derived at the scanning this time is desired for immediate reflection for the bad environment determination.

As another modification, it may be determined whether the environment is a bad environment based on the determination on whether the total same-BIN pair number at the scanning this time is equal to or above a prescribed value, without using the average total same-BIN pair number. This method can provide excellent responsiveness but somewhat less stability. To improve stability in the modification, it is advisable to judge that the environment is a bad environment in the case where the total same-BIN pair number at the scanning this time has been kept equal to or above the prescribed value more than a prescribed times.

In the embodiment above, static object pair data are used for bad environment determination. However, the invention is not limited to this. The peak signals before the pair data being generated may be used for bad environment determination. Specifically, at the time of performing a direction calculation processing to the extracted peak signal extracted in an UP section or a DOWN section, the number of the peak signals each of which includes a plurality of angle information is derived for use for the bad environment determination. In the embodiment described above, the number of the frequencies of static object pair data is used; in this case, the number of the peak signals is used. However, the method itself for determining whether environment is a bad environment can be performed based on the same concept.

In the embodiments described above, various functions are implemented by software, specifically by CPU arithmetic processing based on programs. However, some of these functions may be implemented by electrical hardware circuits. Contrarily, in the embodiments described above, some of the functions implemented by hardware circuits may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that is installed in a vehicle and that derives information about a target, the radar apparatus comprising:
   a transmission antenna configured to generate a transmission wave from a transmission signal whose frequency changes in a prescribed cycle;
   a reception antenna configured to receive a reflection wave generated by the transmission wave reflecting from the target, and outputting a reception signal representing the reflection wave; and
   a signal processor configured to:
      extract a peak signal that is obtained from a difference frequency between the transmission signal whose frequency changes in the prescribed cycle and the reception signal, in each of an up period in which the frequency of the transmission signal increases and a down period in which the frequency of the transmission signal decreases;
      determine (i) whether there is a peak signal that corresponds to a static object and that has a plurality of angle information, among the extracted peak signals, and (ii) the number of the extracted peak signals that correspond to the static object and that have the plurality of angle information,
      determine that a target information derivation environment in which the static object is located is good when the determined number of the extracted peak signals that correspond to the static object and that have the plurality of angle information is less than a predetermined threshold, and
      determine that the target information derivation environment in which the static object is located is bad when the determined number of the extracted peak signals that correspond to the static object and that have the plurality of angle information is equal to or greater than the predetermined threshold.

2. The radar apparatus of claim 1, wherein the signal processor is further configured to:
   pair the peak signal extracted in the up period and the peak signal extracted in the down period to generate pair data, wherein
   the signal processor determines whether the target information derivation environment is good or bad based on a number of the pair data that correspond to the static object and that have the plurality of angle information.

3. The radar apparatus of claim 2, wherein
the signal processor derives the number of the pair data that correspond to the static object and that have the plurality of angle information, for each of predetermined frequencies.

4. The radar apparatus of claim 2, wherein
the signal processor determines that the target information derivation environment is bad in a case where the number of the pair data that correspond to the static object and that have the plurality of angle information is equal to or greater than a first threshold.

5. The radar apparatus of claim 4, wherein
the signal processor determines that the target information derivation environment is good in a case where in a previous determination processing it was determined that the target information derivation environment is bad, and further in a current determination processing the number of the pair data that correspond to the static object and that have the plurality of angle information is equal to or less than a second threshold that is smaller than the first threshold.

6. The radar apparatus of claim 2, wherein
the signal processor determines whether the target information derivation environment is good or bad based on a plurality of the pair data that correspond to the static object and that have the plurality of angle information, the plurality being derived previously in a prescribed number of times of derivation.

7. A radar apparatus that is installed in a vehicle and that derives information about a target, the radar apparatus comprising:
   a transmission antenna configured to generate a transmission wave from a transmission signal whose frequency changes in a prescribed cycle;
   a reception antenna configured to receive a reflection wave generated by the transmission wave reflecting from the target, and outputting a reception signal representing the reflection wave; and
   a signal processor configured to:
      extract a peak signal that is obtained from a difference frequency between the transmission signal whose frequency changes in the prescribed cycle and the reception signal, in each of an up period in which the frequency of the transmission signal increases and a down period in which the frequency of the transmission signal decreases;
      pair the peak signal extracted in the up period and the peak signal extracted in the down period to generate pair data;
      determine (i) whether there is a pair data that corresponds to a static object and that has a plurality of angle information, among the pair data, and (ii) the number of the pair data that correspond to the static object and that have the plurality of angle information,
      determine that a target information derivation environment in which the static object is located is good when the determined number of the pair data that correspond to the static object and that have the plurality of angle information is less than a predetermined threshold, and
      determine that the target information derivation environment in which the static object is located is bad when the determined number of the pair data that correspond to the static object and that have the plurality of angle information is equal to or greater than the predetermined threshold.

8. The radar apparatus of claim 7, wherein
the signal processor derives the number of the pair data that correspond to the static object and that have the plurality of angle information, for each of predetermined frequencies.

9. The radar apparatus of claim 7, wherein
the signal processor determines that the target information derivation environment is bad in a case where the number of the pair data that correspond to the static object and that have the plurality of angle information is equal to or greater than a first threshold.

10. The radar apparatus of claim 9, wherein
the signal processor determines that the target information derivation environment is good in a case where in a previous determination processing it was determined that the target information derivation environment is bad, and further in a current determination processing the number of the pair data that correspond to the static object and that have the plurality of angle information is equal to or less than a second threshold that is smaller than the first threshold.

11. The radar apparatus of claim 7, wherein
the signal processor determines whether the target information derivation environment is good or bad based on a plurality of the pair data that correspond to the static object and that have the plurality of angle information, the a plurality being derived previously in a prescribed number of times of derivation.

12. A signal processing method performed by a signal processor of a radar apparatus that is installed on a vehicle and that includes, in addition to the signal processor, (a) a transmission antenna configured to generate a transmission wave from a transmission signal whose frequency changes in a prescribed cycle, and (b) a reception antenna configured to receive a reflection wave generated by the transmission wave reflecting from the target, and outputting a reception signal representing the reflection wave, the method comprising the steps of:
  (a) extracting a peak signal that is obtained from a difference frequency between the transmission signal whose frequency changes in the prescribed cycle and the reception signal, in each of an up period in which the frequency of the transmission signal increases and a down period in which the frequency of the transmission signal decreases;
  (b) pairing the peak signal extracted in the up period and the peak signal extracted in the down period to generate pair data;
  (c) determining (i) whether there is a pair data that corresponds to a static object and that has a plurality of angle information, among the pair data, and (ii) the number of the pair data that correspond to the static object and that have the plurality of angle information;
  (d) determining that a target information derivation environment in which the static object is located is good when the determined number of the pair data that correspond to the static object and that have the plurality of angle information is less than a predetermined threshold; and
  (e) determining that the target information derivation environment in which the static object is located is bad when the determined number of the pair data that correspond to the static object and that have the plurality of angle information is equal to or greater than the predetermined threshold.

13. The signal processing method of claim 12, wherein
the step (c) includes determining the number of the pair data that correspond to the static object and that have the plurality of angle information, for each of predetermined frequencies.

14. The signal processing method of claim 12, wherein
the step (e) determines that the target information derivation environment is bad in a case where the number of the pair data that correspond to the static object and that have the plurality of angle information is equal to or greater than a first threshold.

15. The signal processing method of claim 14, wherein
the step (d) determines that the target information derivation environment is good in a case where in a previous determination processing it was determined that the target information derivation environment is bad, and further in a current determination processing the number of the pair data that correspond to the static object and that have the plurality of angle information is equal to or less than a second threshold that is smaller than the first threshold.

16. The signal processing method of claim 12, wherein
the steps (d) and (e) determine whether the target information derivation environment is good or bad based on a plurality of numbers of the pair data that correspond to the static object and that have the plurality of angle information, the plurality being derived previously in a prescribed number of times of derivation.

* * * * *